US011894604B2

(12) United States Patent
Suzuki et al.

(10) Patent No.: US 11,894,604 B2
(45) Date of Patent: Feb. 6, 2024

(54) COMMUNICATION APPARATUS

(71) Applicant: Sony Mobile Communications Inc., Tokyo (JP)

(72) Inventors: Yuichiro Suzuki, Tokyo (JP); Shen Wang, Tokyo (JP); Toru Ozone, Tokyo (JP); Jin Sato, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 122 days.

(21) Appl. No.: 17/712,189

(22) Filed: Apr. 4, 2022

(65) Prior Publication Data
US 2022/0231404 A1    Jul. 21, 2022

Related U.S. Application Data

(63) Continuation of application No. 16/491,573, filed as application No. PCT/JP2017/045522 on Dec. 19, 2017, now Pat. No. 11,329,364.

(30) Foreign Application Priority Data

Mar. 15, 2017 (JP) .................................. 2017-049422

(51) Int. Cl.
*H01Q 21/28* (2006.01)
*H01Q 1/24* (2006.01)
(Continued)

(52) U.S. Cl.
CPC ............ *H01Q 1/243* (2013.01); *H01Q 21/065* (2013.01); *H01Q 21/08* (2013.01); *H01Q 21/24* (2013.01); *H04M 1/0266* (2013.01)

(58) Field of Classification Search
CPC ...... H01Q 1/243; H01Q 21/065; H01Q 21/08; H01Q 21/24; H01Q 13/10; H01Q 13/08; H01Q 21/28; H04M 1/0266; H04B 7/0413

See application file for complete search history.

(56) References Cited

U.S. PATENT DOCUMENTS 6,031,503 A    2/2000  Preiss, II et al.
6,104,349 A *  8/2000  Cohen .................... H01Q 1/246
                                                            343/702

(Continued)

FOREIGN PATENT DOCUMENTS

CN    103368624 A    10/2013
CN    103765674 A    4/2014

(Continued)

OTHER PUBLICATIONS

International Search Report and Written Opinion dated Mar. 6, 2018 for PCT/JP2017/045522 filed on Dec. 19, 2017, 8 pages including English Translation of the International Search Report.

(Continued)

*Primary Examiner* — Hai V Tran
*Assistant Examiner* — Bamidele A Immanuel
(74) *Attorney, Agent, or Firm* — XSENSUS LLP

(57) ABSTRACT

To realize polarization MIMO in a more suitable form in a mobile communication apparatus.

A communication apparatus includes a plurality of antenna parts configured to receive or transmit a wireless signal, a communication control part configured to control transmitting or receiving the wireless signal via at least any of the plurality of antenna parts, and a casing housing the communication control part, in which each of the plurality of antenna parts is held near each of a plurality of partial regions normal directions of which cross each other or the normal directions of which are mutually twisted in outer (Continued)

faces of the casing, and transmit or receive a first wireless signal and a second wireless signal propagating in directions substantially orthogonal to the partial regions and having mutually different polarization directions.

9 Claims, 31 Drawing Sheets

(51) Int. Cl.
*H01Q 21/06* (2006.01)
*H01Q 21/08* (2006.01)
*H01Q 21/24* (2006.01)
*H04M 1/02* (2006.01)

(56) References Cited

U.S. PATENT DOCUMENTS

| | | | |
|---|---|---|---|
| 6,147,648 A * | 11/2000 | Granholm | H01Q 21/065 343/700 MS |
| 9,088,069 B2 | 7/2015 | Bungo | |
| 2002/0122006 A1* | 9/2002 | Crawford | H01Q 9/0407 343/702 |
| 2007/0057854 A1 | 3/2007 | Dodachi et al. | |
| 2009/0051619 A1 | 2/2009 | Hook et al. | |
| 2009/0115673 A1 | 5/2009 | Nysen | |
| 2009/0143038 A1 | 6/2009 | Saito | |
| 2010/0120379 A1* | 5/2010 | Fukagawa | H01Q 1/2266 455/90.2 |
| 2011/0032866 A1 | 2/2011 | Leabman | |
| 2011/0065400 A1* | 3/2011 | Teikari | H01Q 1/2291 455/129 |
| 2012/0009884 A1* | 1/2012 | Rao | H01Q 13/10 455/115.2 |
| 2013/0050056 A1* | 2/2013 | Lee | H01Q 3/30 343/893 |
| 2013/0147664 A1* | 6/2013 | Lin | H01Q 13/085 342/368 |
| 2013/0257668 A1* | 10/2013 | Rao | H01Q 21/28 343/893 |
| 2013/0257672 A1* | 10/2013 | Lu | H01Q 21/00 343/893 |
| 2013/0328723 A1* | 12/2013 | Rappaport | H01Q 3/24 342/372 |
| 2013/0335293 A1 | 12/2013 | Zhang et al. | |
| 2014/0132457 A1 | 5/2014 | Galeev | |
| 2014/0141731 A1* | 5/2014 | Abudul-Gaffoor | H04B 1/44 343/893 |
| 2015/0054707 A1* | 2/2015 | Sugimoto | H01Q 1/3208 343/846 |
| 2015/0171916 A1 | 6/2015 | Asrani et al. | |
| 2015/0325925 A1 | 11/2015 | Kamgaing et al. | |
| 2016/0064829 A1* | 3/2016 | Schaepperle | H01Q 9/0435 343/893 |
| 2016/0087348 A1* | 3/2016 | Ko | H01Q 21/205 455/73 |
| 2016/0093939 A1 | 3/2016 | Kim et al. | |
| 2016/0164178 A1 | 6/2016 | Komachi et al. | |
| 2016/0172761 A1 | 6/2016 | Garcia et al. | |
| 2016/0301997 A1* | 10/2016 | Shindo | H04R 1/028 |
| 2016/0322714 A1* | 11/2016 | Ying | H01Q 9/0407 |
| 2016/0351996 A1 | 12/2016 | Ou | |
| 2017/0040668 A1* | 2/2017 | Ayala Vazquez | H01Q 13/106 |
| 2017/0062908 A1 | 3/2017 | Sanderovich et al. | |
| 2017/0062953 A1 | 3/2017 | Teshima et al. | |
| 2017/0201011 A1* | 7/2017 | Khripkov | H01Q 1/42 |
| 2017/0222333 A1* | 8/2017 | Sudo | H01Q 1/38 |
| 2017/0244818 A1 | 8/2017 | Kim et al. | |
| 2017/0310367 A1 | 10/2017 | Choi et al. | |
| 2018/0026341 A1* | 1/2018 | Mow | H01Q 1/243 343/702 |
| 2018/0062256 A1 | 3/2018 | Kim et al. | |
| 2018/0138595 A1 | 5/2018 | Nysen et al. | |
| 2018/0151947 A1 | 5/2018 | Apostolos et al. | |
| 2018/0152024 A1 | 5/2018 | Zeine et al. | |
| 2018/0233817 A1 | 8/2018 | Izawa | |
| 2018/0366813 A1 | 12/2018 | Kim et al. | |

FOREIGN PATENT DOCUMENTS

| | | |
|---|---|---|
| CN | 204947073 A | 1/2016 |
| CN | 106230494 A | 12/2016 |
| CN | 106450689 A | 2/2017 |
| GB | 2459919 A | 11/2009 |
| JP | 2002-94317 A | 3/2002 |
| JP | 2002-185235 A | 6/2002 |
| JP | 2002-330026 A | 11/2002 |
| JP | 2013-70365 A | 4/2013 |
| JP | 2016-515782 A | 5/2016 |

OTHER PUBLICATIONS

Extended European Search Report dated Feb. 3, 2020 in European Application No. 17900975.8-1205.
Office Action dated Aug. 4, 2020, in corresponding Chinese patent Application No. 201780088063.9, 27 pages.
Office Action dated Sep. 29, 2020, in corresponding Japanese patent Application No. 2019-505714, 5 pages.

* cited by examiner

COMMUNICATION APPARATUS

CROSS-REFERENCE TO RELATED APPLICATIONS

This application is a continuation of U.S. application Ser. No. 16/491,573, filed Sep. 6, 2019, which is based on PCT filing PCT/JP2017/045522, filed Dec. 19, 2017, and claims priority to JP 2017-049422, filed Mar. 15, 2017, the entire contents of each are being incorporated herein by reference.

TECHNICAL FIELD

The present disclosure relates to a communication apparatus.

BACKGROUND ART

A wireless signal with a frequency of around 700 MHz to 3.5 GHz called ultrahigh frequency is mainly used for communication in a mobile communication system based on a communication standard called LTE/LTE-Advanced (A).

Further, a technology called multiple-input and multiple-output (MIMO) is employed in communication using an ultrahigh frequency as in the above communication standard so that the communication performance can be further enhanced by use of direct wave and reflected wave for exchanging signals also in the fading environment. A plurality of antennas is used in MIMO, and thus various methods for arranging a plurality of antennas in a more suitable form are discussed for mobile communication terminal apparatuses such as Smartphone. For example. Patent Document 1 discloses an exemplary method for arranging a plurality of antennas for a mobile communication terminal apparatus in a more suitable form assuming the use of MIMO.

CITATION LIST

Patent Document

Patent Document 1: Japanese Patent Application Laid-Open No. 2013-70365

SUMMARY OF THE INVENTION

Problems to be Solved by the Invention

Incidentally, there have been discussed various fifth-generation (5G) mobile communication systems subsequent to LTE/LTE-A in recent years. For example, the use of communication using a wireless signal with a frequency of 28 GHz or 39 GHz called millimeter wave (simply called "millimeter wave" below) is discussed in the mobile communication systems.

A millimeter wave can further increase the amount of information to be transmitted than an ultrahigh frequency, and tends to be high in straightness and to increase in propagation loss or reflection loss. Thus, it has been known that a direct wave mainly contributes to the communication property and a reflected wave is the least influential in wireless communication using millimeter waves. The introduction of a technology called polarization MIMO is discussed from the above property, which realizes MIMO by use of a plurality of polarized waves (such as horizontal polarized wave and vertical polarized wave) with mutually different polarization directions in the 5G mobile communication systems. The use of polarization MIMO is desired from the background also in a mobile communication apparatus like a mobile communication terminal apparatus.

Thus, the present disclosure proposes an exemplary technology capable of realizing polarization MIMO in a more suitable form in a mobile communication apparatus.

Solutions to Problems

According to the present disclosure, there is provided a communication apparatus including a plurality of antenna parts configured to receive or transmit a wireless signal, a communication control part configured to control transmitting or receiving the wireless signal via at least any of the plurality of antenna parts, and a casing housing the communication control part, in which each of the plurality of antenna parts is held near each of a plurality of partial regions normal directions of which cross each other or the normal directions of which are mutually twisted in outer faces of the casing, and transmit or receive a first wireless signal and a second wireless signal propagating in directions substantially orthogonal to the partial regions and having mutually different polarization directions.

Effects of the Invention

According to the present disclosure described above, there is provided a technology capable of realizing polarization MIMO in a more suitable form in a portable apparatus.

Additionally, the above effect is not necessarily restrictive, and any effect described in the present specification or other effect graspable from the present specification may be obtained together with the above effect or instead of the above effect.

MODE FOR CARRYING OUT THE INVENTION

Figure 1:
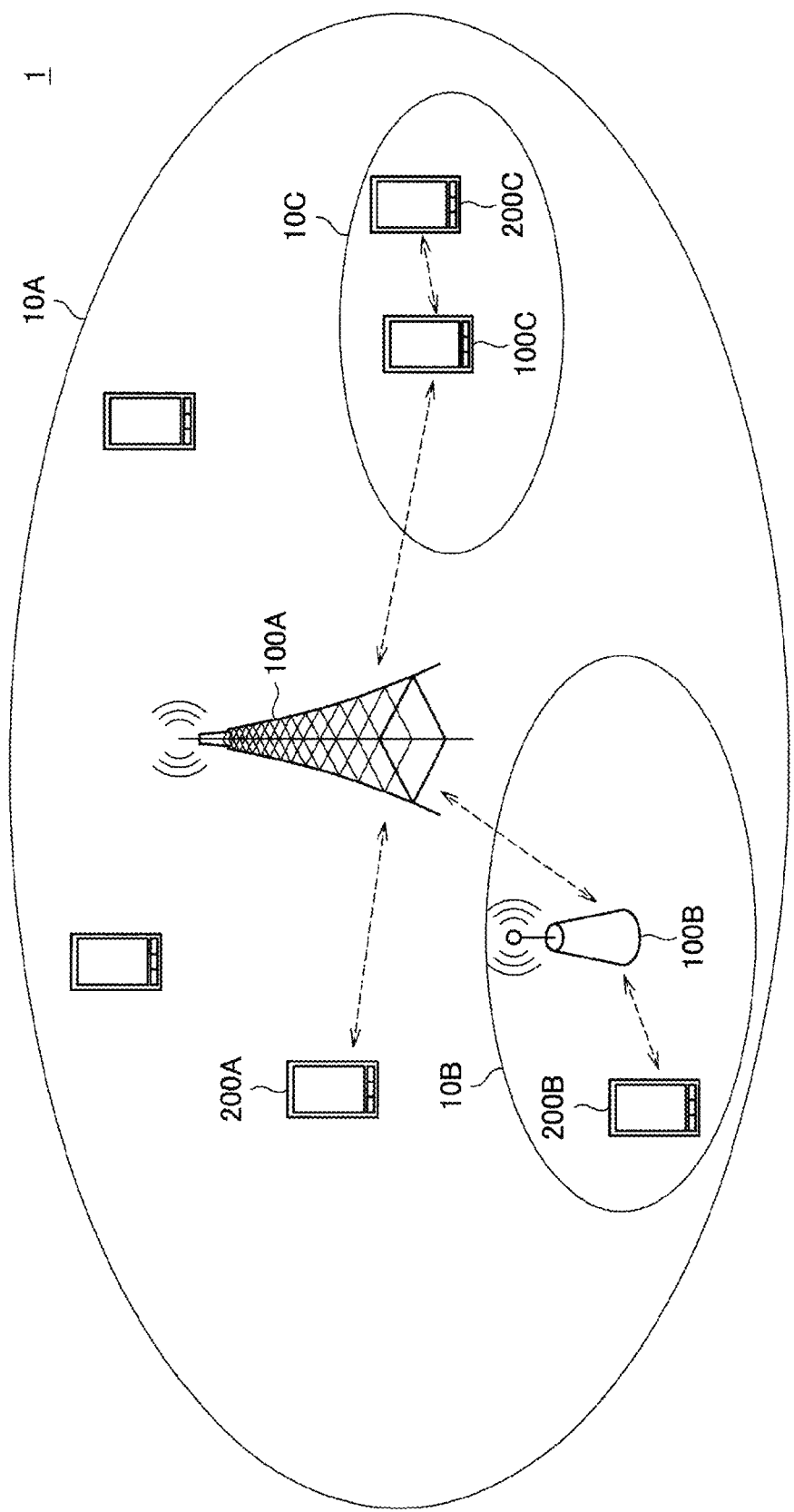
FIG. 1 is an explanatory diagram for explaining an exemplary schematic configuration of a system according to one embodiment of the present disclosure.

Preferred embodiments of the present disclosure will be described below in detail with reference to the accompanying drawings. Additionally, the components having substantially the same functional configurations are denoted with the same reference numerals, respectively, in the present specification and the drawings, and a repeated description thereof will be omitted.

Additionally, the description will be made in the following order.
1. Schematic configuration
1.1. Exemplary system configuration
1.2. Exemplary configuration of terminal apparatus
2. Examination of communication using millimeter waves
3. Technical characteristics
3.1. Comparative example
3.2. Exemplary configuration
3.3. Variants
3.4. Examples
3.5. Applications
4. Conclusion

1. SCHEMATIC CONFIGURATION

<1.1. Exemplary System Configuration>

An exemplary schematic configuration of a system 1 according to one embodiment of the present disclosure will be first described with reference to FIG. 1. FIG. 1 is an explanatory diagram for explaining an exemplary schematic configuration of the system 1 according to one embodiment of the present disclosure. As illustrated in FIG. 1, the system 1 includes wireless communication apparatuses 100 and terminal apparatuses 200. A terminal apparatus 200 is also called user herein. The user can be also called UE. A wireless communication apparatus 100C is also called UE-Relay. Here, UE may be defined in LTE or LTE-A, or Prose UE to Network Relay discussed in 3GPP, or may more generally mean a communication device.

(1) Wireless Communication Apparatuses 100

The wireless communication apparatuses 100 are directed to providing a wireless communication service to their controlling apparatuses. For example, a wireless communication apparatus 100A is a base station of a cellular system (or mobile communication system). The base station 100A makes wireless communication with apparatuses (such as a terminal apparatus 200A) positioned inside a cell 10A of the base station 100A. For example, the base station 100A transmits a downlink signal to the terminal apparatus 200A, and receives an uplink signal from the terminal apparatus 200A.

The base station 100A is logically connected to other base station via an X2 interface, for example, and can exchange control information and the like therewith. Further, the base station 100A is logically connected to a so-called core network (not illustrated) via an SI interface, for example, and can exchange control information and the like therewith.

Additionally, the communication between the apparatuses can be physically relayed via various apparatuses.

Here, the wireless communication apparatus 100A illustrated in FIG. 1 is a macrocell base station and the cell 10A is a macrocell. On the other hand, the wireless communication apparatuses 100B and 100C are master devices which operate small cells 10B and 10C, respectively. By way of example, the master device 100B is a fixedly-installed small cell base station. The small cell base station 100B establishes a wireless backhaul link with the macrocell base station 100A, and an access link with one or more terminal apparatuses (such as the terminal apparatus 200B) in the small cell 10B. Additionally, the wireless communication apparatus 100B may be a relay node defined in 3GPP. The master device 100C is a dynamic access point (AP). The dynamic AP 100C is a mobile device which dynamically operates the small cell 10C. The dynamic AP 100C establishes a wireless backhaul link with the macrocell base station 100A, and an access link with one or more terminal apparatuses (such as the terminal apparatus 200C) in the small cell 10C. The dynamic AP 100C may be a terminal apparatus mounting thereon hardware or software operable as a base station or a wireless access point, for example. In this case, the small cell 10C is a dynamically-formed localized network/virtual cell.

The cell 10A may be operated according to any wireless communication system such as LTE, LTE-Advanced (LTE-A), LTE-ADVANCED PRO, GSM (registered trademark), UMTS, W-CDMA, CDMA200, WiMAX, WiMAX2, or IEEE802.16.

Additionally, the concept of a small cell can include various types of cells (such as femtocell, nanocell, picocell, and microcell) smaller than a macrocell arranged to be overlapped or not to be overlapped with the macrocell. In some examples, a small cell is operated by a dedicated base station. In other examples, a small cell is operated when a terminal as master device temporarily operates as a small cell base station. A relay node can be also regarded as one form of the small cell base station. A wireless communication apparatus functioning as a master station of the relay node is also called donor base station. The donor base station may mean DeNB in LTE or may more generally mean a master station of a relay node.

(2) Terminal Apparatuses 200

The terminal apparatuses 200 can make communication in a cellular system (or mobile communication system). The terminal apparatuses 200 make wireless communication with wireless communication apparatuses (such as the base station 100A and the mater device 100B or 100C) in the cellular system. For example, the terminal apparatus 200A receives a downlink signal from the base station 100A, and transmits an uplink signal to the base station 100A.

Further, not only so-called UE but also so-called low cost UE such as MTC terminal, enhanced MTC (eMTC), and NB-IoT terminal may be operated for the terminal apparatuses 200.

(3) Supplement

A schematic configuration of the system 1 has been described above, but the present technology is not limited to the example illustrated in FIG. 1. For example, a configuration of the system 1 can employ a configuration not including master device, small cell enhancement (SCE), heterogeneous network (HetNet), a MTC network, and the like. Further, as other exemplary configuration of the system 1, a master device is connected to a small cell, and a cell may be constructed under the small cell.

An exemplary schematic configuration of the system 1 according to one embodiment of the present disclosure has been described above with reference to FIG. 1.

<1.2. Exemplary Configuration of Terminal Apparatus>

Figure 2:
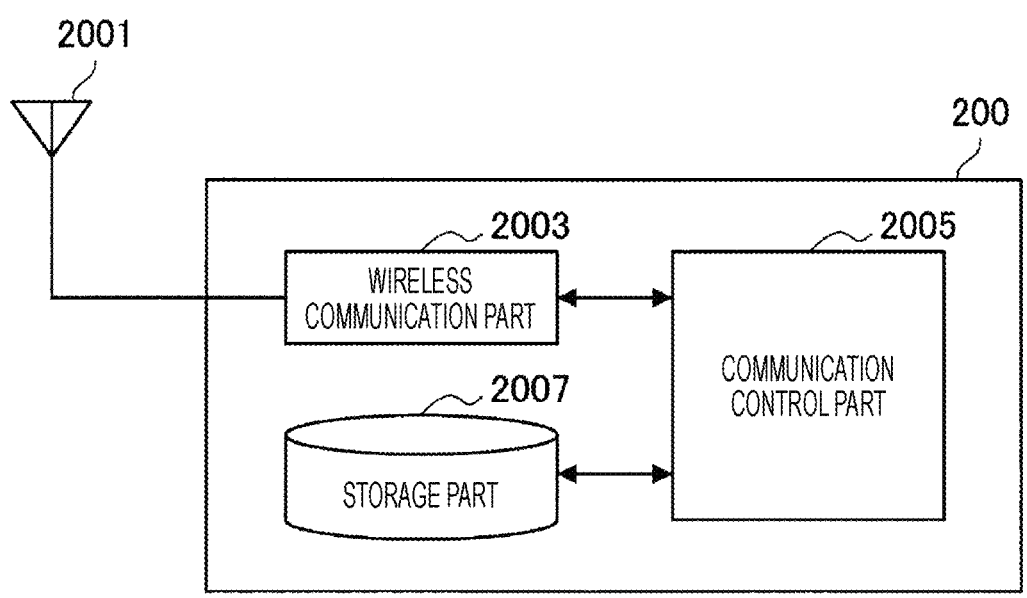
FIG. 2 is a block diagram illustrating an exemplary configuration of a terminal apparatus according to the embodiment.

An exemplary configuration of the terminal apparatus 200 according to an embodiment of the present disclosure will be described below with reference to FIG. 2. FIG. 2 is a block diagram illustrating an exemplary configuration of the terminal apparatus 200 according to an embodiment of the present disclosure. As illustrated in FIG. 2, the terminal apparatus 200 includes an antenna part 2001, a wireless communication part 2003, a storage part 2007, and a communication control part 2005.

(1) Antenna Pan 2001

The antenna part 2001 radiates a signal output from the wireless communication part 2003 as a radiowave to the space. Further, the antenna part 2001 converts the radiowave in the space into a signal, and outputs the signal to the wireless communication part 220.

(2) Wireless Communication Part 2003

The wireless communication part 2003 exchanges signals. For example, the wireless communication part 2003 receives a downlink signal from a base station, and transmits an uplink signal to the base station.

(3) Storage Part 2007

The storage part 2007 temporarily or permanently stores programs and various items of data for operating the terminal apparatus 200.

(4) Communication Control Part 2005

The communication control part 2005 controls the operations of the wireless communication part 2003 thereby to control communication with other apparatus (such as the base station 100). As a specific example, the communication control part 2005 may modulate data to be transmitted on the basis of a predetermined modulation system thereby to generate a transmission signal, and may cause the wireless communication part 2003 to transmit the transmission signal to the base station 100. Further, as other example, the communication control part 2005 may acquire a signal reception result (or reception signal) from the base station 100 by the wireless communication part 2003, and may perform a predetermined demodulation processing on the reception signal thereby to demodulate the data transmitted from the base station 100.

An exemplary configuration of the terminal apparatus 200 according to the embodiment of the present disclosure has been described above with reference to FIG. 2.

<<2.2. Examination of Communication Using Millimeter Waves>>

A wireless signal with a frequency of around 700 MHz to 3.5 GHz called ultrahigh frequency is used for communication in the communication system based on a standard such as LTE/LTE-A. To the contrary, the use of communication using a wireless signal with a frequency of 28 GHz or 39 GHz called millimeter wave (simply called "millimeter wave" below) is examined in the fifth-generation (5G) mobile communication system subsequent to LTE/LTE-A. Thus, an outline of communication using millimeter waves will be described, and then technical problems of the communication apparatus according to one embodiment of the present disclosure will be described.

A technology called multiple-input and multiple-output (MIMO) is employed in communication using an ultrahigh frequency such as LTE/LTE-A so that the communication performance can be further enhanced by use of direct wave and reflected wave for exchanging signals also in the fading environment.

To the contrary, a millimeter wave can further increase the amount of information to be transmitted than an ultrahigh frequency, and tends to be high in straightness and to increase in propagation loss or reflection loss. Thus, a reflected wave is the least influential and a direct wave mainly contributes to the communication property in an environment (so-called line of site (LOS)) in which an obstacle is not present on a path directly connecting the antennas via which wireless signals are exchanged. Due to the property, a communication terminal such as Smartphone receives a wireless signal (or millimeter wave) directly transmitted from a base station (or receives a direct wave) thereby to further enhance the communication performance in communication using millimeter waves.

Further, as described above, a direct wave mainly contributes to the communication property and a reflected wave is the least influential in communication using millimeter waves. Due to the property, the introduction of a technology called polarization MIMO is examined, which realizes MIMO by use of a plurality of polarized waves (such as horizontal polarized wave and vertical polarized wave) with mutually different polarization directions in wireless signals transmitted as direct waves in communication using millimeter waves between a communication terminal and a base station. Additionally, a "polarization direction" corresponds to a direction in which a wireless signal (or polarized wave) oscillates in the present disclosure. That is, a so-called "polarization plane" is defined by a direction in which a wireless signal propagates and a polarization direction of the wireless signal. Further, a polarized wave the polarization plane of which is vertical to the ground corresponds to "vertical polarized wave" and a polarized wave the polarization plane of which is horizontal to the ground corresponds to "horizontal polarized wave".

However, a portable terminal apparatus such as mobile communication terminal including Smartphone changes in its position or orientation over time along with movement of a user holding the terminal apparatus, a change in form of holding the terminal apparatus, or the like. Under such a situation, a relative positional relationship between a terminal apparatus and a base station changes over time, and thus a direction in which a direct wave arrives at the terminal apparatus from a base station also changes. This is similarly applicable when a communication apparatus itself is mobile.

Further, as described above, a millimeter wave is higher in reflection loss than an ultrahigh frequency, and is more easily reflected by a human body. Thus, for example, if a communication path directly connecting an antenna device provided in a terminal apparatus and a base station is blocked by a site such as hand holding the casing of the terminal apparatus, a millimeter wave propagating in the communication path is blocked by the site such as hand. That is, a position in the terminal apparatus capable of exchanging millimeter waves via communication with a base station (or a position not blocked by a hand or the like) also changes depending on a position of the terminal apparatus held by a site such as hand.

In terms of the above situation, the present disclosure proposes a communication apparatus capable of realizing polarization MIMO using a direct wave in a more suitable form in communication with other apparatus via a wireless communication path also in a situation in which a position or orientation changes over time.

3. TECHNICAL CHARACTERISTICS

Technical characteristics of a communication apparatus according to one embodiment of the present disclosure will be described below.

3.1. COMPARATIVE EXAMPLE

Figure 3:
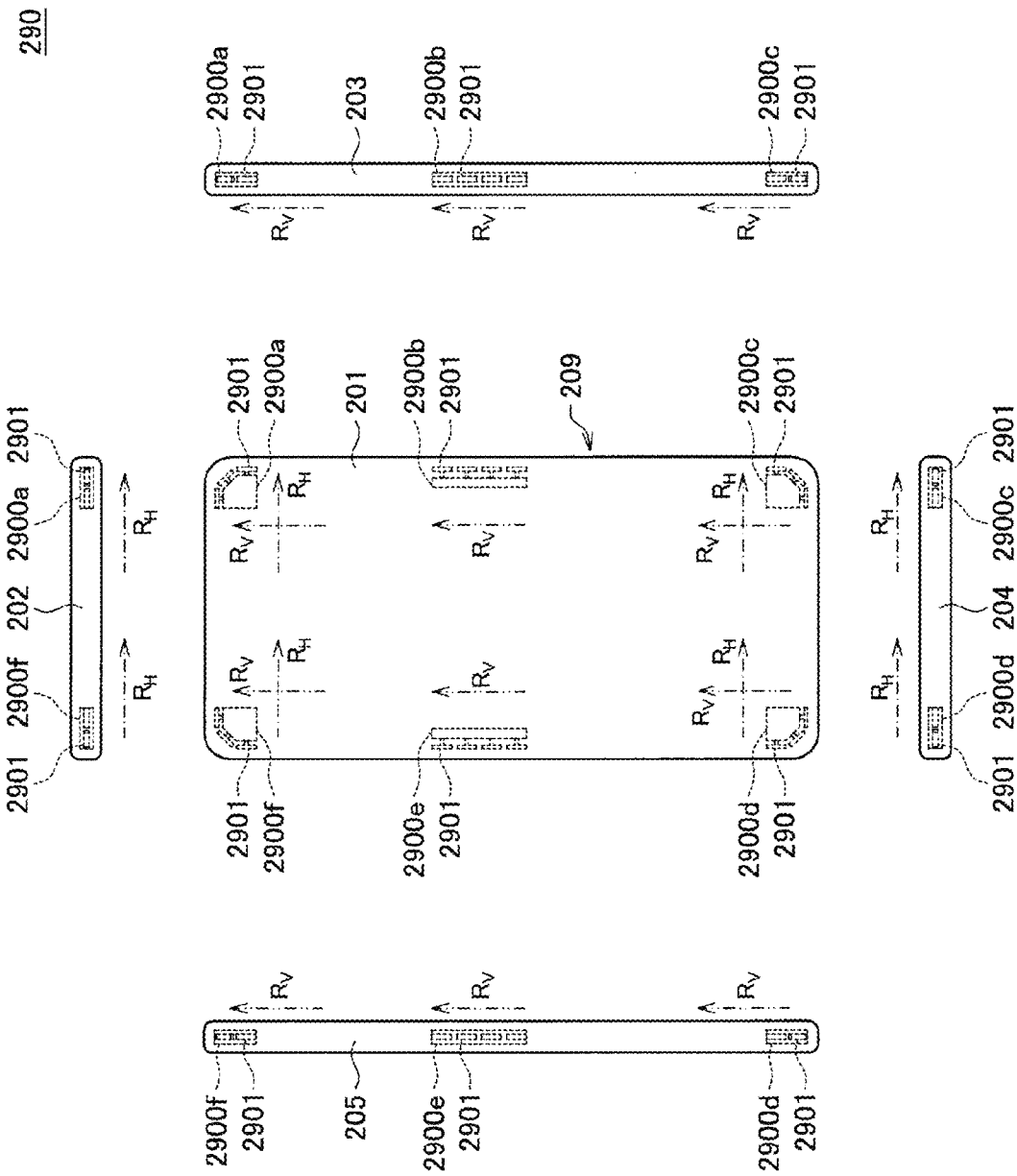
FIG. 3 is an explanatory diagram for explaining an exemplary configuration of a communication apparatus according to a comparative example.

An exemplary configuration of a communication apparatus according to a comparative example will be first described with reference to FIG. 3 in order to easily understand the characteristics of a communication apparatus (such as the terminal apparatus 200) according to the present embodiment. FIG. 3 is an explanatory diagram for explaining an exemplary configuration of the communication apparatus according to the comparative example. Additionally, the communication apparatus according to the comparative example may be denoted as "communication apparatus 290" in the following description in order to discriminate from the communication apparatus according to the present embodiment.

The communication apparatus 290 according to the comparative example includes a plate-shaped casing 209 which has a top side and a backside and forms a substantially-rectangular shape. Additionally, a side on which a display part such as display is provided is called top side in the present description. That is, a reference numeral 201 in FIG. 3 indicates the backside in the outer faces of the casing 20). Further, reference numerals 203 and 205 correspond to end faces positioned around the backside 201 in the outer faces of the casing 209, and more specifically indicate end faces extending in the longitudinal direction of the backside 201. Further, reference numerals 202 and 204 correspond to end faces positioned around the backside 201 in the outer faces of the casing 209, and more specifically indicate end faces extending in the short direction of the backside 201. Additionally, though not illustrated in FIG. 3, a top side positioned opposite to the backside 201 is also called "top side 206" for convenience.

Further, reference numerals 2900a to 2900f in FIG. 3 indicate an antenna apparatus for exchanging wireless signals (such as millimeter waves) with a base station. Additionally, in a case where the antenna apparatuses 2900a to 2900f are not particularly discriminated in the following description, they may be simply called "antenna apparatuses 2900". Further, a reference numeral 2901 indicates an individual antenna device (such as antenna element). Additionally, in the example illustrated in FIG. 3, the antenna device 2901 is configured as a so-called dipole antenna.

As illustrated in FIG. 3, the communication apparatus 290 is configured such that the antenna apparatuses 2900 are held (installed) inside the casing 209 to be positioned near each of the end faces 202 to 205 provided along the outer periphery of the backside 201 (in other words, the top side 206).

For example, the antenna apparatus 2900a is provided inside the casing 209 to be positioned near both the end faces 202 and 203. Further, the antenna apparatus 2900a has a plurality of antenna devices 2901 configured as dipole antennas. Specifically, some antenna devices 2901 among the plurality of antenna devices 2901 of the antenna apparatus 2900a are provided to extend in the longitudinal direction of the end face 203, and the other antenna devices 2901 are provided to extend in the longitudinal direction of the end face 205.

Further, the antenna apparatuses 2900c, 2900d, and 2900f are held on the basis of the similar spirit to the antenna apparatus 2900a. That is, the antenna apparatus 2900c is provided inside the casing 209 to be positioned near both the end faces 203 and 204. Further, the antenna apparatus 2900d is provided inside the casing 209 to be positioned near both the end faces 204 and 205. Further, the antenna apparatus 2900f is provided inside the casing 209 to be positioned near both the end faces 205 and 202.

Further, the antenna apparatus 2900b is provided inside the casing 209 to be positioned near the end face 203. Further, the antenna apparatus 2900b has one or more antenna devices 2901 configured as dipole antennas. Specifically, the plurality of antenna devices 2901 of the antenna apparatus 2900b is provided to extend in the longitudinal direction of the end face 203.

Further, the antenna apparatus 2900e is provided on the basis of the similar spirit to the antenna apparatus 2900b. That is, the antenna apparatus 2900e is provided inside the casing 209 to be positioned near the end face 205.

A polarization direction of a polarized wave transmittable or receivable by an antenna apparatus will be described herein. Generally, an antenna apparatus is different in polarization direction of a transmittable or receivable polarized wave depending on the orientation of a current flowing in an element such as a radiation device or waveguide device of the antenna apparatus. For example, in the case of a dipole antenna, a polarized wave the polarization direction of which substantially matches with a direction in which a rod-shaped element extends can be transmitted or received (that is, preferable communication property is indicated). That is, only one polarized wave can be transmitted or received by the dipole antenna.

Thus, the polarization directions of polarized waves capable of being transmitted or received by each of the antenna apparatuses 2900a to 2900f are determined depending on directions in which the elements of the antenna devices 2901 of the antenna apparatuses 2900 extend. For example, the antenna apparatus 2900a includes an antenna device 2901 in which the element extends in the longitudinal direction of the end face 202, and an antenna device 2901 extending in the longitudinal direction of the end face 203. Thus, the antenna apparatus 2900a can transmit or receive two polarized waves including a polarized wave the polarization direction of which substantially matches with the longitudinal direction (or the direction $R_H$ in the figure) of the end face 202, and a polarized wave the polarization direction of which substantially matches with the longitudinal direction (or the direction $R_V$ in the figure) of the end face 203. Further, the antenna apparatus 2900b includes an antenna device 2901 extending in the longitudinal direction of the end face 203. Thus, the antenna apparatus 2900b can transmit or receive a polarized wave the polarization direction of which substantially matches with the longitudinal direction (or the direction $R_V$) of the end face 203. Additionally, in the following description, a polarized wave the polarization direction of which substantially matches with the direction $R_H$ in the figure will be simply called "polarized wave $R_H$" and a polarized wave the polarization direction of which substantially matches with the direction $R_V$ in the figure will be simply called "polarized wave $R_V$". Further, one of the polarized waves $R_H$ and $R_V$ with mutually different polarization directions may correspond to horizontal polarized wave, and the other may correspond to vertical polarized wave.

With the above configuration, the antenna apparatuses 2900a to 2900f are arranged at the respective positions, and thus the communication apparatus 290 can transmit or receive wireless signals propagating in each direction with reference to the communication apparatus 290 by any antenna apparatus 2900. Further, two polarized waves $R_H$ and $R_V$ can be transmitted or received in wireless signals propagating in a direction substantially matching with the normal direction of the backside 201. This is similarly applicable to the top side 206. Further, each of the antenna apparatuses 2900a to 2900f is such that an antenna pattern is arranged on a substrate and an integrated circuit (IC) is arranged near the antenna pattern, thereby reducing the substrate wiring and achieving a high degree of freedom of design.

However, in terms of each of the end faces 202 to 205, transmittable or receivable polarized waves in wireless signals propagating in a direction substantially matching with the normal direction of each end face are limited to only the polarized waves the polarization directions of which substantially match with the longitudinal direction of each end face in the communication apparatus 290. As a specific example, only the polarized wave $R_H$ can be transmitted or received in wireless signals propagating in a direction substantially matching with the normal direction of the end face 202, and a polarized wave the polarization direction of which substantially matches with the short direction (or the thickness direction of the casing 209) of the end face 202 is difficult to transmit or receive. Further, only the polarized wave $R_V$ can be transmitted or received in wireless signals propagating in a direction substantially matching with the normal direction of the end face 205, and a polarized wave the polarization direction of which substantially matches with the short direction (or the thickness direction of the casing 209) of the end face 205 is difficult to transmit or receive.

That is, in a case where polarization MIMO is introduced into communication using millimeter waves, the communication apparatus 290 according to the comparative example deteriorates in the communication property (such as antenna gain) in transmitting or receiving wireless signals propagating in a direction substantially matching with the normal direction of each of the end faces 202 to 205.

An exemplary configuration of the communication apparatus according to the comparative example has been described above with reference to FIG. 3.

3.2. EXEMPLARY CONFIGURATION

An exemplary configuration of a communication apparatus according to the present embodiment will be subsequently described assuming that a patch antenna (plane antenna) is applied.

Figure 4:
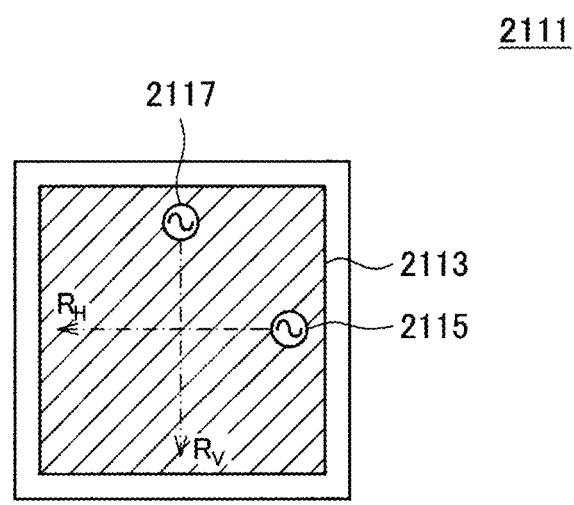
FIG. 4 is an explanatory diagram for explaining an outline of a patch antenna.

An outline of a patch antenna will be first described with reference to FIG. 4. FIG. 4 is an explanatory diagram for explaining an outline of a patch antenna. As described above, a dipole antenna has a rod-shaped element, and thus a current flows only in one direction, and only one polarized wave can be transmitted or received. To the contrary, a patch antenna is provided with a plurality of power supply points, and thus can flow a current in a plurality of directions. For example, a patch antenna 2111 illustrated in FIG. 4 is provided with a plurality of power supply points 2115 and 2117 for a planar element 2113, and is configured to be able to transmit or receive each of the polarized waves $R_H$ and $R_V$ with mutually different (mutually orthogonal) polarization directions.

Figure 5:
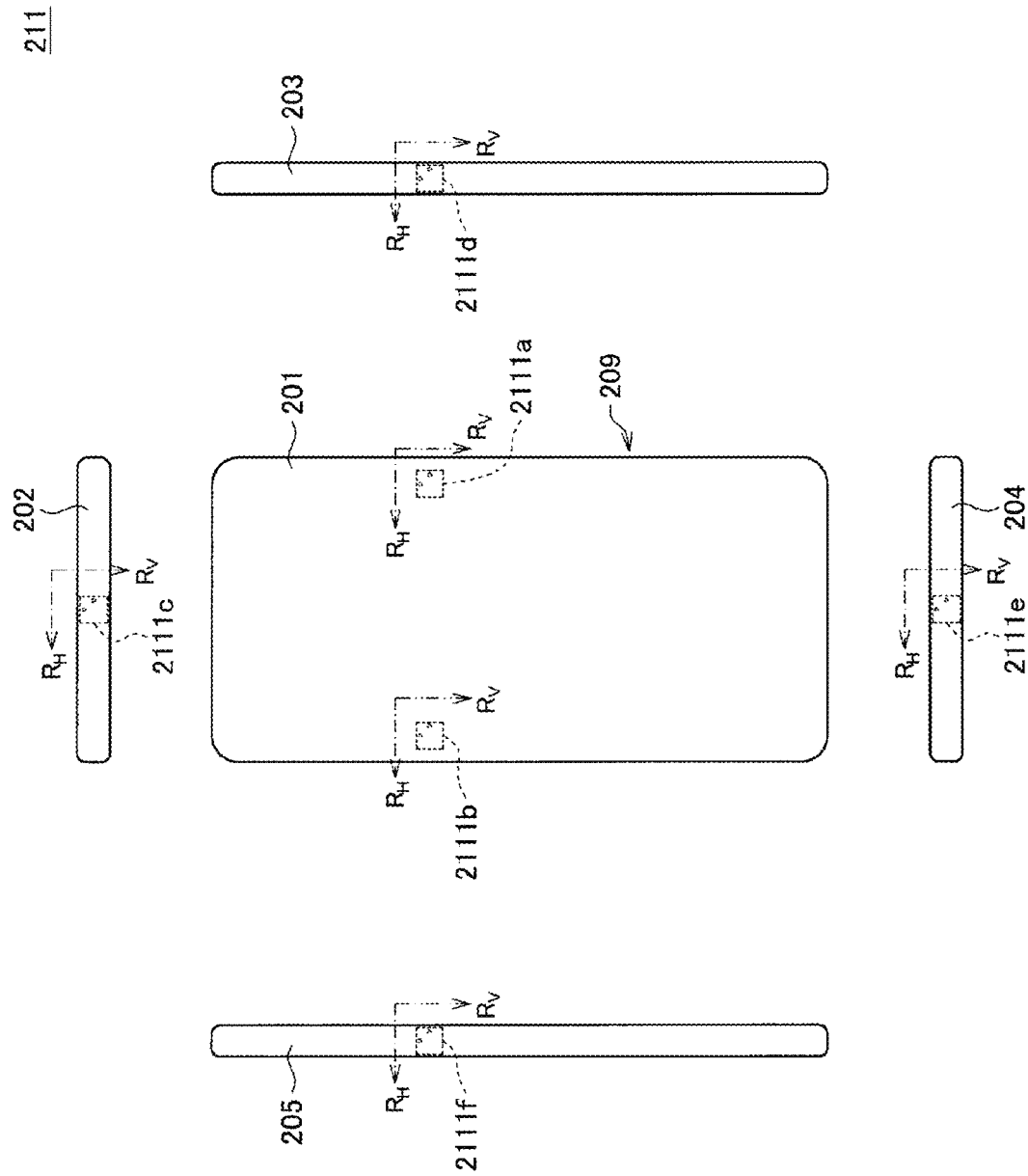
FIG. 5 is an explanatory diagram for explaining an exemplary configuration of a communication apparatus according to the embodiment.

An exemplary configuration of a communication apparatus according to the present embodiment will be described below with reference to FIG. 5. FIG. 5 is an explanatory diagram for explaining an exemplary configuration of a communication apparatus according to the present embodiment. Additionally, the communication apparatus according to the present embodiment illustrated in FIG. 5 may be denoted as "communication apparatus 211" in the following description in order to discriminate from the communication apparatus according to the comparative example or the communication apparatuses according to the respective variants described below. Additionally, the description will be made assuming that the communication apparatus 211 has the similar casing 209 to that of the communication apparatus 290 according to the comparative example. That is, the backside 201 and the end faces 202 to 205 illustrated in FIG. 5 indicate the backside 201 and the end faces 202 to 205 of the casing 209, respectively, similarly to the example illustrated in FIG. 3. This is similarly applicable to the top side 206 (not illustrated).

Reference numerals 2111a to 2111f each indicate an antenna apparatus for exchanging wireless signals (such as millimeter waves) with a base station. In the example illustrated in FIG. 5, each of the antenna apparatuses 2111a to 2111f is configured as the patch antenna 2111 described with reference to FIG. 4. Additionally, each of the antenna apparatuses 2111a to 2111f corresponds to exemplary "antenna parts".

As illustrated in FIG. 5, in the communication apparatus 211, the patch antennas 2111 are held (installed) inside the casing 209 to be positioned near at least some of the backside 201 and each of the end faces 202 to 205. At this time, the patch antenna 2111 held to be positioned near a face is held such that the normal direction of the planar element 2113 substantially matches with the normal direction of the face.

For example, the antenna apparatuses 2111a and 2111b (the patch antennas 2111) are held inside the casing 209 such that they are positioned near the backside 201 and the normal directions thereof substantially match with the normal direction of the backside 201. With the configuration, the antenna apparatuses 2111a and 2111b can transmit or receive the two polarized waves $R_H$ and $R_V$ with mutually different (mutually orthogonal) polarization directions in wireless signals propagating in a direction substantially matching with the normal direction of the backside 201. Additionally, the respective polarization directions of the polarized waves $R_H$ and $R_V$ are orthogonal to the direction in which the wireless signals propagate. Further, though not illustrated in FIG. 5, the patch antennas 2111 may be installed also on the top side 206 similarly to the backside 201.

Further, the antenna apparatus 2111c (patch antenna 2111) is held inside the casing 209 such that it is positioned near the end face 202 and the normal direction thereof substantially matches with the normal direction of the end face 202. That is, the antenna apparatus 2111c can transmit or receive the two polarized waves $R_H$ and $R_V$ with mutually different (mutually orthogonal) polarization directions in wireless signals propagating in a direction substantially matching with the normal direction of the end face 202. Further, each of the antenna apparatuses 2111d to 2111f is held on the basis of the similar spirit to the antenna apparatus c. That is, the antenna apparatus 2111d is held inside the casing 209 such that it is positioned near the end face 203 and its normal direction substantially matches with the normal direction of the end face 203. Further, the antenna apparatus 2111e is held inside the casing 209 such that it is positioned near the end face 204 and its normal direction substantially matches with the normal direction of the end face 204. Further, the antenna apparatus 2111f is held inside the casing 209 such that it is positioned near the end face 205 and its normal direction substantially matches with the normal direction of the end face 205.

In this way, the communication apparatus 211 according to the present embodiment is such that an antenna apparatus is held near each partial region with a mutually different direction or each of a plurality of partial regions with mutually different normal directions on the outer faces of the casing 209. Particularly the communication apparatus 211 according to the present embodiment is such that an antenna apparatus (such as patch antenna 2111) is held near each of a plurality of partial regions the normal directions of which cross each other or the normal directions of which are mutually twisted in the outer faces of the casing 209 like the backside 201 (or the top side 206) and each of the end faces 202 to 205. Further, the antenna apparatus is configured to be able to transmit or receive a plurality of polarized waves (such as two polarized waves $R_H$ and $R_V$) propagating in directions substantially matching with the normal directions of the partial regions positioned nearby (or in directions substantially orthogonal to the partial regions) and having mutually different polarization directions. Additionally, one polarized wave of the plurality of polarized waves (such as polarized waves $R_H$ and $R_V$) transmitted or received by the antenna apparatus corresponds to "first wireless signal" and the other polarized wave corresponds to "second wireless signal".

With the above configuration, the communication apparatus 211 according to the present embodiment can transmit or receive the two polarized waves $R_H$ and $R_V$ with mutually different polarization directions in wireless signals propagating in a direction substantially matching with the normal directions of any face of six faces of the backside 201, the top side 206, and the end faces 202 to 205 of the casing 209.

Figure 6:
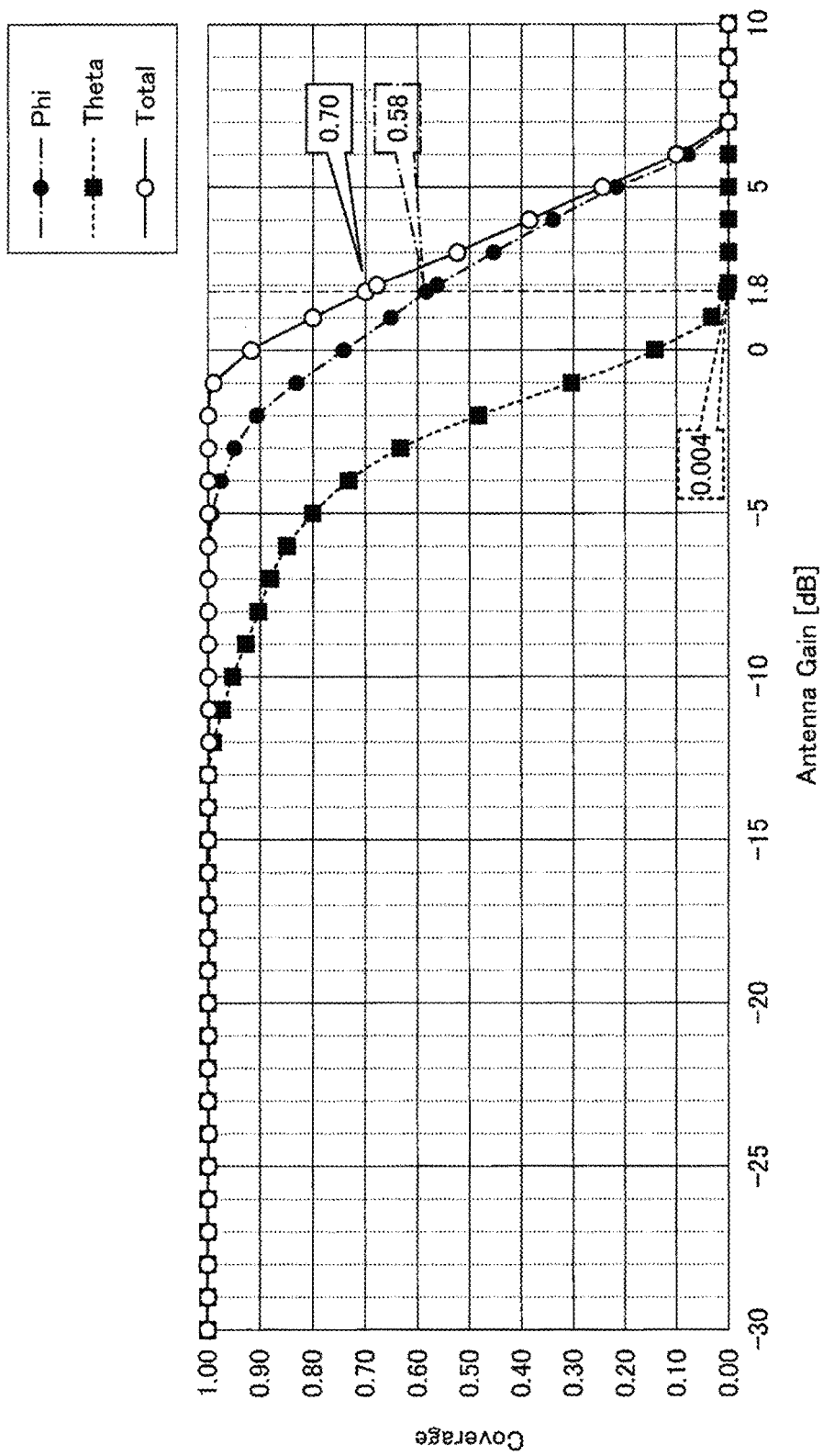
FIG. 6 is a diagram illustrating exemplary communication property simulation results in a case where a dipole antenna is used as an antenna apparatus.
Figure 7:
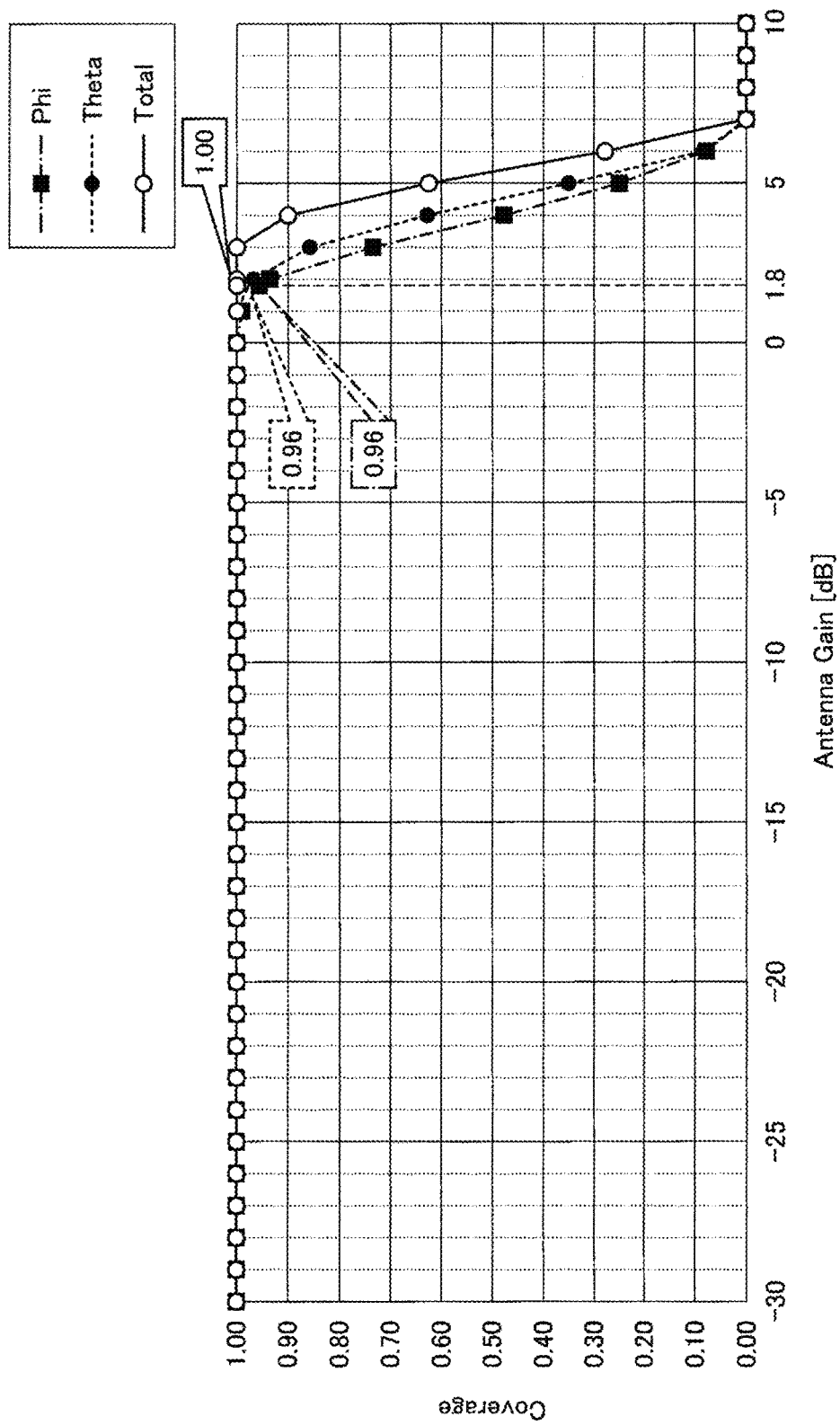
FIG. 7 illustrates exemplary communication property simulation results in a case where a patch antenna is used as an antenna apparatus.

Exemplary communication properties will be described herein with reference to FIG. 6 and FIG. 7 assuming that a dipole antenna and a patch antenna are used as antenna apparatuses. For example, FIG. 6 is a diagram illustrating exemplary communication property simulation results in a case where a dipole antenna is used as an antenna apparatus. Further, FIG. 7 illustrates exemplary communication property simulation results in a case where a patch antenna is used as an antenna apparatus. The horizontal axis in FIG. 6 and FIG. 7 indicates antenna gain. Further, the vertical axis indicates coverage, or a ratio of a region with antenna gain of a value indicated on the horizontal axis or more relative to the 360-degree spherical plane with reference to each apparatus. Additionally, FIG. 6 and FIG. 7 illustrate simulation results for V polarization with a polarization direction of Phi direction, H polarization with a polarization direction of Theta direction, and total polarization. Further, FIG. 6 and FIG. 7 indicate exemplary simulation results in a case where the target antenna gain is assumed at 1.8 dB.

As illustrated in FIG. 6, in a case where a dipole antenna is used, 70% of the coverage is totally secured at an antenna gain of 1.8 dB. However, the coverage per polarization is as low as 58% for V polarization (Phi direction), and is so low at 0.004% for H polarization (Theta direction).

To the contrary, in a case where a patch antenna is used, 100% of the coverage can be totally secured at an antenna gain of 1.8 dB as illustrated in FIG. 7. Further, the coverage per polarization is also secured at 96% for both V polarization (Phi direction) and H polarization (Theta direction). It can be seen from the above fact that a preferable communication property is demonstrated for both V polarization (Phi direction) and H polarization (Theta direction) in almost all the directions in a case where a patch antenna is used.

An exemplary configuration of the communication apparatus according to the present embodiment has been described above with reference to FIG. 4 to FIG. 7 in a case where a patch antenna (planar antenna) is applied. Additionally, the simulation results described with reference to FIG. 6 and FIG. 7 are merely exemplary, and the target antenna gain may be different per antenna to be used.

3.3. VARIANTS

Variants of the communication apparatus according to the present embodiment will be subsequently described.
(First Variant: Exemplary Configuration in a Case where Beam Forming is Performed)

An exemplary configuration of a communication apparatus according to a first variant will be first described in a case where a technology called beam forming is used.

An outline of beam forming will be first described. Beam forming is a technology for enhancing directivity of an antenna apparatus (or narrowing a beam) thereby to enable an antenna gain to be enhanced when transmitting or receiving a wireless signal propagating in a direction by the directivity. Specifically, in beam forming, the phases or power of wireless signals transmitted or received by each of a plurality of antennas (such as antenna elements) are controlled thereby to optimize a radiowave sensitivity at a specific point. The control can further enhance the antenna gain in a case where a wireless signal is transmitted or received in a direction with the directivity of an antenna apparatus.

Figure 8:
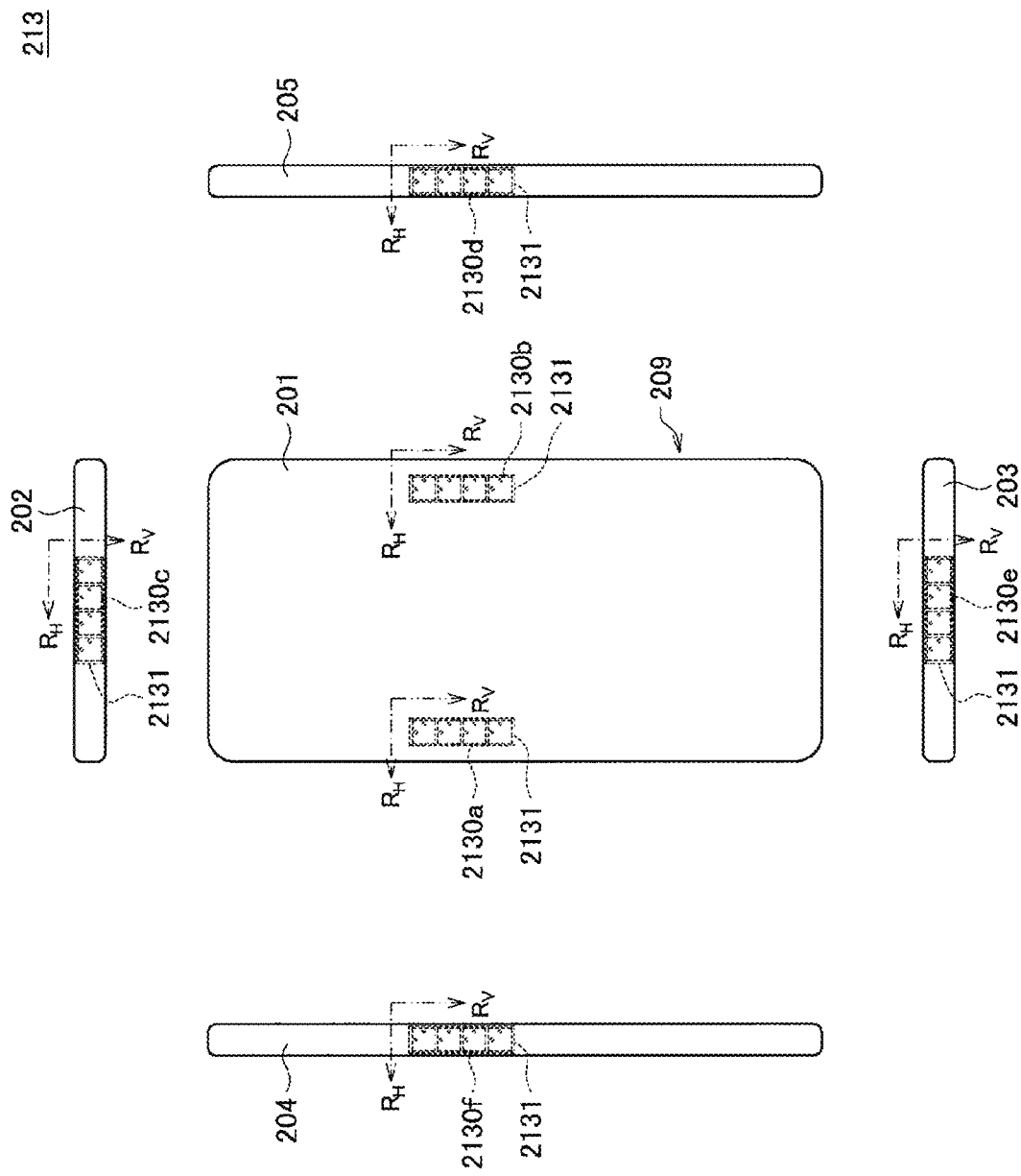
FIG. 8 is an explanatory diagram for explaining an exemplary configuration of a communication apparatus according to a first variant.

A configuration of a communication apparatus according to the first variant will be described below with reference to FIG. 8. FIG. 8 is an explanatory diagram for explaining an exemplary configuration of the communication apparatus according to the first variant. Additionally, the communication apparatus according to the first variant may be denoted as "communication apparatus 213" in the following description in order to discriminate from the communication apparatus according to the above embodiment or the communication apparatuses according to the other variants. Additionally, the present description will be made assuming that the communication apparatus 213 has the similar casing 209 to the communication apparatus 211 according to the above embodiment. That is, it is assumed that the backside 201 and each of the end faces 202 to 205 illustrated in FIG. 8 indicate the backside 201 and each of the end faces 202 to 205 of the casing 209, similarly as in the example illustrated in FIG. 5. This is similarly applicable to the top side 206 (not illustrated).

Reference numerals 2130a to 2130f in FIG. 8 each indicate an antenna apparatus for exchanging wireless signals (such as millimeter waves) with a base station. Additionally, in a case where the antenna apparatuses 2130a to 2130f are not particularly discriminated from each other, they may be simply denoted as "antenna apparatuses 2130" in the following description.

As illustrated in FIG. 8, in the communication apparatus 213 according to the first variant, the antenna apparatuses 2130 are held (installed) inside the casing 209 to be positioned near at least some of the backside 201 and each of the end faces 202 to 205 similarly to the communication apparatus 211 described with reference to FIG. 5.

Further, an antenna apparatus 2130 includes a plurality of antenna devices 2131. For example, the antenna apparatus 2131a is held to be positioned near the end close to the end face 204 on the backside 201, where a plurality of antenna devices 2131 is provided to be arranged in a direction in which the end extends (or in the longitudinal direction of the end face 204). Further, the antenna apparatus 2131d is held to be positioned near part of the end face 205, where a plurality of antenna devices 2131 is provided to be arranged in the longitudinal diction of the end face 205.

Further, each antenna device 2131 has the similar configuration to the patch antenna 2111 described with reference to FIG. 4 and FIG. 5. That is, in an antenna apparatus 2130 held to be positioned near a face, each antenna device 2131 is held such that the normal direction of the planar element (such as the element 2113 illustrated in FIG. 3) substantially matches with the normal direction of the face. As a more specific example, in terms of the antenna apparatus 2130a, the antenna devices 2131 provided in the antenna apparatus 2130a are held such that the normal directions of the planar elements substantially match with the normal direction of the backside 201. This is similarly applicable to the other antenna apparatuses 2130b to 2130f.

With the above configuration, each antenna apparatus 2130 controls the phases or power of wireless signals transmitted or received by each of the plurality of antenna devices 2131, thereby to control the directivity of the wireless signals (or to perform beam forming).

An exemplary configuration of the communication apparatus according to the first variant has been described above with reference to FIG. 8 in a case where a technology called beam forming is used. Additionally, the above configuration of the antenna apparatuses 2130 is merely exemplary, and does not necessarily limit the configuration of the antenna apparatuses 2130. For example, if each of the plurality of antenna devices 2131 can transmit or receive wireless signals propagating in a direction substantially matching with the normal direction of a face which the antenna apparatus 2130 is held near, the position where each of the plurality of antenna devices 2131 is arranged is not particularly limited. That is, the plurality of antenna devices 2131 may not be arranged only in one direction, not as illustrated in FIG. 8. For example, the plurality of antenna devices 2131 may be arranged in a matrix shape. This is similarly applicable also when a plurality of antenna devices is arranged in the other variants described below.

(Second Variant: Exemplary Configuration of Antenna Apparatus)

An exemplary configuration of an antenna apparatus applied to the communication apparatus according to the preset embodiment will be subsequently described according to a second variant.

In the communication apparatus 213 described with reference to FIG. 8, the antenna apparatuses 2130 provided on each face can be provided near each other in terms of the backside 201 and each of the end faces 204 and 205 which are mutually continuous on the outer faces of the casing 209. Specifically, the antenna apparatus 2130a and the antenna apparatus 2130f are adjusted in their respective holding positions to be positioned near the boundary between the backside 201 and the end face 204, thereby being provided near each other. Similarly, the antenna apparatus 2130b and the antenna apparatus 2130d are adjusted in their respective holding positions to be positioned near the boundary between the backside 201 and the end face 205, thereby being provided near each other.

In terms of such a situation, the second variant will be described in a case where the antenna apparatuses capable of being installed near each other among the antenna apparatuses 2130 described according to the first variant are integrally configured. For example, FIG. 9 is an explanatory diagram for explaining an exemplary configuration of the antenna apparatuses according to the second variant, and is a schematic perspective view of the antenna apparatuses.

Figure 9:
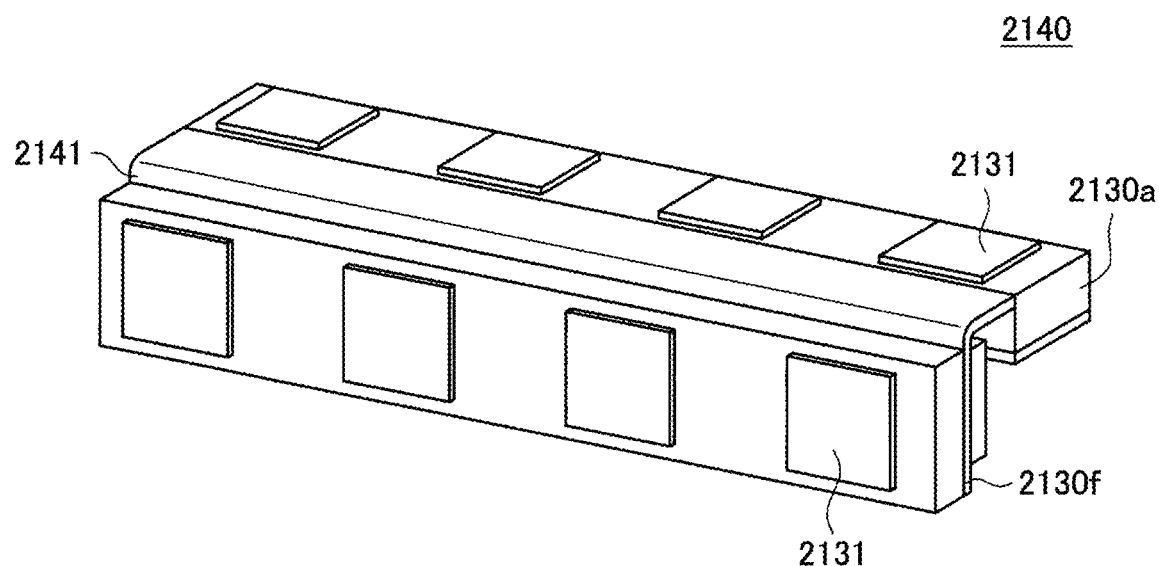
FIG. 9 is an explanatory diagram for explaining an exemplary configuration of an antenna apparatus according to a second variant.

As illustrated in FIG. 9, an antenna apparatus 2140 according to the second variant is configured such that two mutually different antenna apparatuses 2130 are coupled by a coupling part 2141. Additionally, the example illustrated in FIG. 9 illustrates that the antenna apparatuses 2130a and 2130f described with reference to FIG. 8 are coupled to be integrally configured by way of example in order to easily understand the characteristics of the antenna apparatus 2140.

Specifically, the antenna apparatus 2130a and the antenna apparatus 2130if are arranged such that the respective ends extending in the directions in which the plurality of antenna devices 2131 is arranged are positioned near each other. At this time, the antenna devices 2131 of the antenna apparatus 2130a and the antenna devices 2131 of the antenna apparatus 2130f are arranged such that the normal directions of the planar elements cross each other (or are orthogonal to each other) or the normal directions are mutually twisted. Further, the coupling part 2141 is provided to cross the ends positioned near each other between the antenna apparatus 2130a and the antenna apparatus 2130f, and the antenna apparatus 2130a and the antenna apparatus 2130f are coupled by the coupling part 2141.

It is better that the thus-configured antenna apparatus 2140 is held along a plurality of mutually-coupled faces (outer faces) on the outer faces of the casing 209 like the backside 201 and the end face 204 illustrated in FIG. 8, for example. With the configuration, each of a plurality of polarized waves with mutually different polarization directions, which arrives at each of the plurality of mutually-coupled faces in the directions substantially orthogonal to the faces, can be transmitted or received in a more suitable form.

An exemplary configuration of the antenna apparatus applied to the communication apparatus according to the present embodiment has been described above according to the second variant with reference to FIG. 9.

(Third Variant: Exemplary Configuration in a Case where Short-Circuit Patch Antenna is Applied)

An exemplary configuration of an antenna apparatus according to a third variant will be subsequently described in a case where a short-circuit patch antenna is applied as an antenna device.

Figure 10:
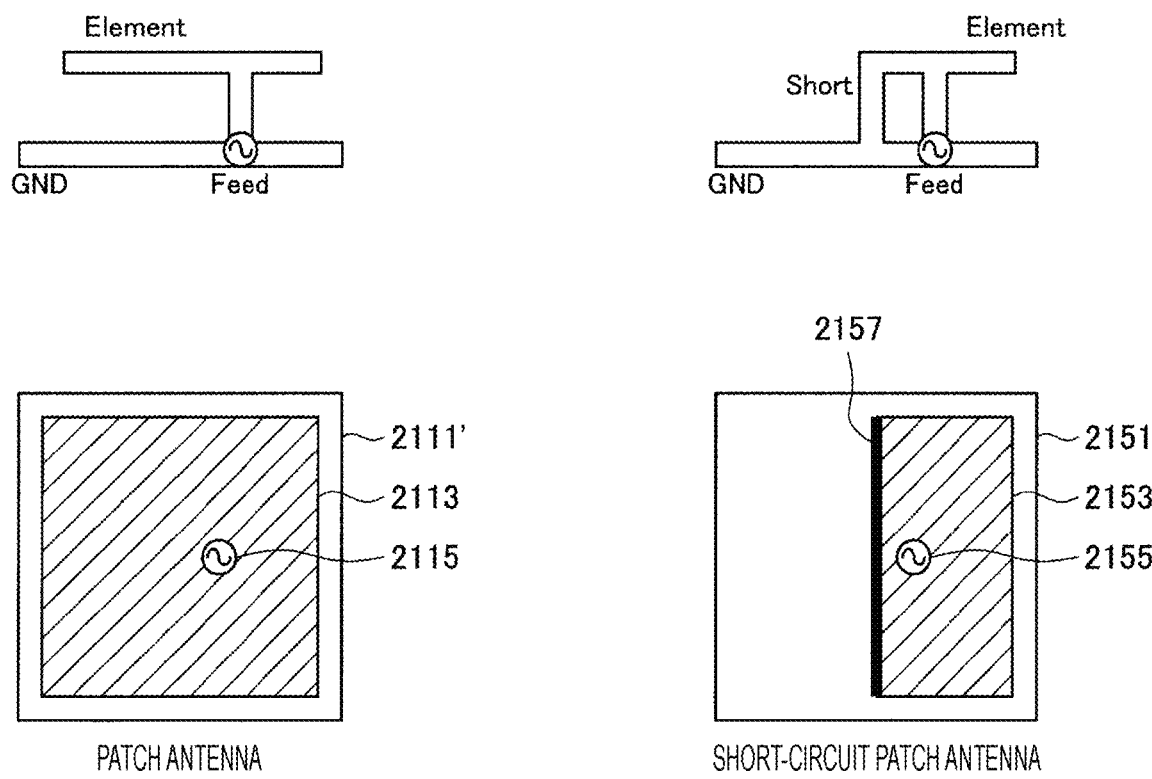
FIG. 10 is an explanatory diagram for explaining an outline of a short-circuit patch antenna.

An outline of a short-circuit patch antenna will be first described with reference to FIG. 10. FIG. 10 is an explanatory diagram for explaining an outline of a short-circuit patch antenna. In FIG. 10, the two diagrams on the left side illustrate an exemplary schematic configuration of a patch antenna, and the two diagrams on the right side illustrate an exemplary schematic configuration of a short-circuit patch antenna.

Specifically, the lower left diagram illustrates an exemplary schematic configuration of a patch antenna 2111' viewed in the normal direction of the planar element 2113. Additionally, the example illustrated in FIG. 10 illustrates that one power supply point is provided for the patch antenna 2111' illustrated in FIG. 10 (or only a power supply point 2115 is provided) in order to easily understand the characteristics of the short-circuit patch antenna. Further, the upper left diagram illustrates an exemplary schematic configuration of the lower left patch antenna 2111' viewed from an end, where the vertical direction corresponds to the thickness direction of the lower left patch antenna 2111'(or the normal direction of the element 2113). That is, part of the planar element 2113 downward extends, and the power supply point is provided between the extending part and the ground (GND).

Further, the lower right diagram illustrates an exemplary schematic configuration of a short-circuit patch antenna 2151 viewed in the normal direction of a planar element 2153. As illustrated, the short-circuit patch antenna 2151 is provided with a power supply point 2155 at part of the element 2153. Further, the short-circuit patch antenna 2151 is provide with a short-circuit part 2157 short-circuited (or electrically connected to the GND) at a different position from the position where the power supply point 2155 is provided on the element 2153. For example, the upper right diagram illustrates an exemplary schematic configuration of the lower right short-circuit patch antenna 2151 viewed from an end, where the vertical direction corresponds to the thickness direction of the lower right short-circuit patch antenna 2151 (or the normal direction of the element 2153).

As illustrated in FIG. 10, the short-circuit patch antenna 2151 has one power supply point, and thus a plurality of polarized waves is difficult to transmit or receive unlike the patch antenna 2111 described with reference to FIG. 4. However, the short-circuit patch antenna 2151 can reduce the rate of the region occupied by the planar element 2153 as compared with the patch antenna 2111 as illustrated in FIG. 10, thereby achieving further downsizing.

Figure 11:
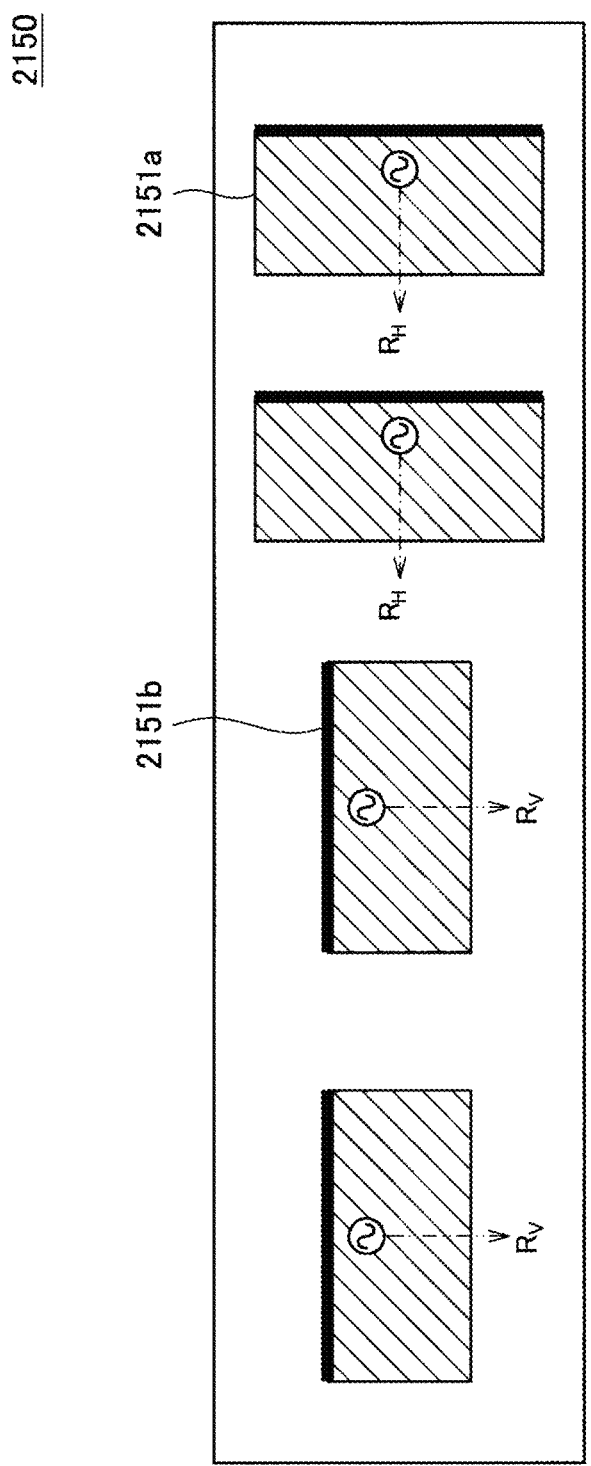
FIG. 11 is a diagram illustrating an exemplary configuration of an antenna apparatus according to a third variant.

According to the above description, an exemplary configuration of an antenna apparatus in which the short-circuit patch antenna 2151 described with reference to FIG. 10 is applied as an antenna device will be described with reference to FIG. 11. FIG. 11 is a diagram illustrating an exemplary configuration of an antenna apparatus according to the third variant. Additionally, FIG. 11 illustrates an exemplary schematic configuration of an antenna apparatus 2150 viewed in the normal direction of a face in a case where the antenna apparatus 2150 according to the third variant is positioned near the face (such as part of the outer faces of the casing 209). That is, the antenna apparatus 2150 illustrated in FIG. 11 mainly transmits or receives wireless signals propagating in a direction substantially matching with the depth direction of FIG. 11.

As described above, the short-circuit patch antenna 2151 can transmit or receive only one polarized wave. Thus, the antenna apparatus 2150 illustrated in FIG. 11 is provided with a plurality of short-circuit patch antennas 2151 (or short-circuit patch antennas 2151a and 2151b) to be able to transmit or receive polarized waves with mutually different polarization directions.

Specifically, the short-circuit patch antenna 2151a is arranged such that the direction of a current flowing in the planar element substantially matches with the direction in which the plurality of short-circuit patch antennas 2151 is arranged (or the horizontal direction of FIG. 11). That is, the short-circuit patch antenna 2151a can transmit or receive the polarized wave RR the polarization direction of which substantially matches with the direction in which the plurality of short-circuit patch antennas 2151 is arranged in wireless signals transmitted or received by the antenna apparatus 2150.

To the contrary, the short-circuit patch antenna 2151b is arranged such that the direction of a current flowing in the planar element substantially matches with a direction orthogonal to the direction in which the plurality of short-circuit patch antennas 2151 is arranged (or the vertical direction of FIG. 11). That is, the short-circuit patch antenna 2151b can transmit or receive the polarized wave $R_V$ the polarization direction of which substantially matches with the direction orthogonal to the direction in which the plurality of short-circuit patch antennas 2151 is arranged in wireless signals transmitted or received by the antenna apparatus 2150.

With the above configuration, the antenna apparatus 2150 according to the third variant can transmit or receive a plurality of polarized waves with mutually different polarization directions also in a case where the short-circuit patch antennas 2151 capable of transmitting or receiving only one polarized wave are applied.

Additionally, if one or more short-circuit patch antennas 2151a and 2151b are each provided, the numbers of short-circuit patch antennas 2151a and 2151b are not particularly limited. However, it is desirable that a plurality of short-circuit patch antennas 2151a and 2151b is each provided as in the communication apparatus 213 according to the first variant in a case where beam forming is used.

An exemplary configuration of the antenna apparatus has been described above according to the third variant with reference to FIG. 10 and FIG. 11 in a case where short-circuit patch antennas are applied as antenna devices.

(Fourth Variant: Exemplary Configuration in a Case where Dipole Antenna is Applied)

An exemplary configuration of an antenna apparatus according to a fourth variant will be subsequently described in a case where a dipole antenna is applied as an antenna device.

As described above, a current flows in a rod-shaped element in one direction, and thus a dipole antenna itself can transmit or receive only one polarized wave. On the other hand, on the basis of the similar spirit to the third variant, a plurality of antenna devices is arranged in consideration of the direction of a polarized wave transmittable or receivable by each antenna device, thereby transmitting or receiving polarized waves with mutually different polarization directions similarly to the patch antenna.

Figure 12:
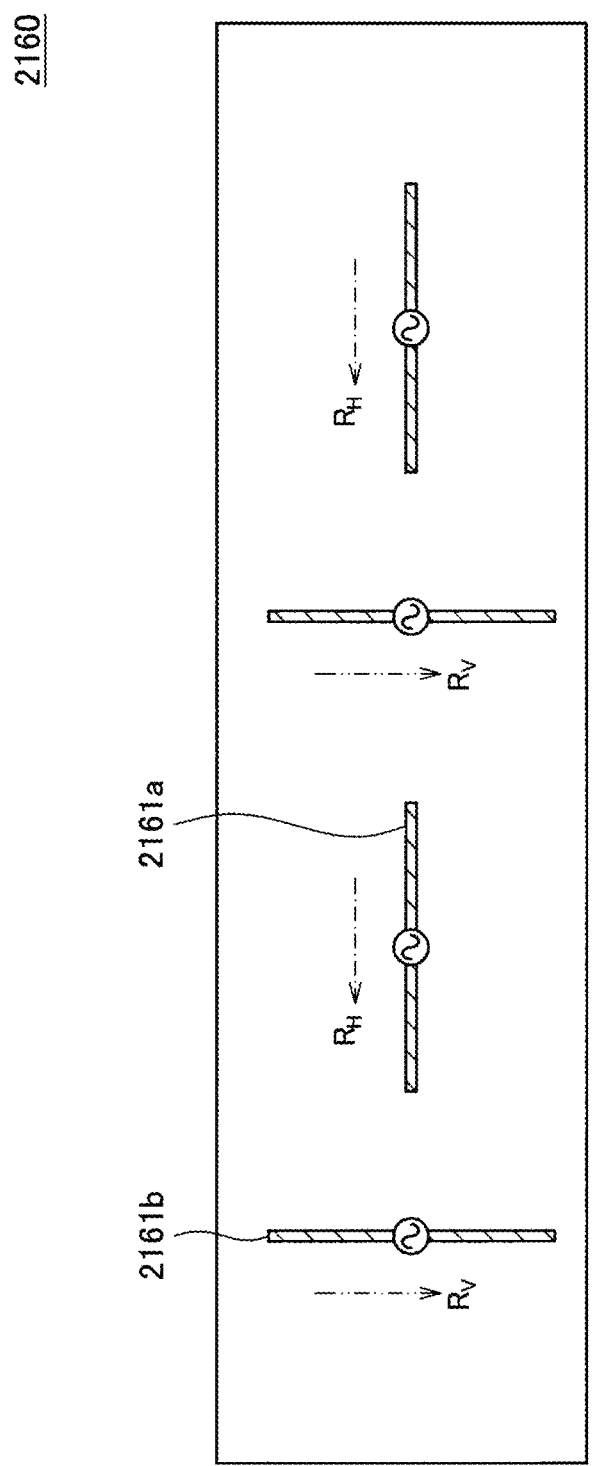
FIG. 12 is a diagram illustrating an exemplary configuration of an antenna apparatus according to a fourth variant.
Figure 13:
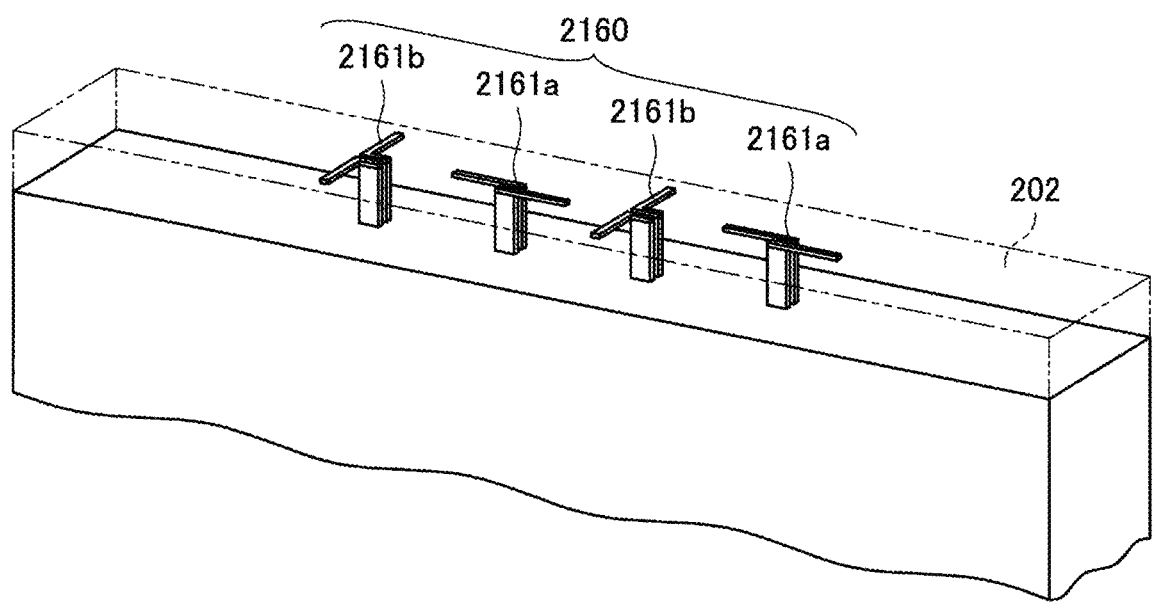
FIG. 13 is a diagram illustrating an exemplary configuration of the antenna apparatus according to the fourth variant.

For example, FIG. 12 and FIG. 13 are diagrams illustrating exemplary configurations of an antenna apparatus according to the fourth variant. Additionally, FIG. 12 illustrates an exemplary schematic configuration of an antenna apparatus 2160 viewed in the normal direction of a face in a case where the antenna apparatus 2160 according to the fourth variant is held to be positioned near the face (such as part of the outer faces of the casing 209). That is, the antenna apparatus 2160 illustrated in FIG. 12 mainly transmits or receives wireless signals propagating in a direction substantially matching with the depth direction of FIG. 12.

As illustrated in FIG. 12, the antenna apparatus 2160 is provided with a plurality of dipole antennas 2161 (or dipole antennas 2161a ad 2161b) to be able to transmit or receive polarized waves with mutually different polarization directions.

The dipole antenna 2161a is arranged such that the direction of a current flowing in the rod-shaped element substantially matches with a direction in which the plurality of dipole antennas 2161 are arranged (or the horizontal direction of FIG. 12). That is, the dipole antenna 2161a can transmit or receive the polarized wave $R_H$ the polarization direction of which substantially matches with the direction in which the plurality of dipole antennas 2161 is arranged in wireless signals transmitted or received by the antenna apparatus 2160.

To the contrary, the dipole antenna 2161b is arranged such that the direction of a current flowing in the rod-shaped element substantially matches with a direction orthogonal to the direction in which the plurality of dipole antennas 2161 is arranged (or the vertical direction of FIG. 12). That is, the dipole antenna 2161a can transmit or receive the polarized wave $R_V$ the polarization direction of which substantially matches with the direction orthogonal to the direction in which the plurality of dipole antennas 2161 is arranged in wireless signals transmitted or received by the antenna apparatus 2160.

For example, FIG. 13 is a diagram illustrating an exemplary schematic internal structure of a part where the antenna apparatus 2160 is arranged in the casing 209 of the communication apparatus (such as the terminal apparatus 200) according to the present embodiment, and schematically illustrates an exemplary method for arranging the respective antenna devices (or the dipole antennas 2161) included in the antenna apparatus 2160. Additionally, FIG. 13 illustrates that the antenna apparatus 2160 is arranged to be positioned near the end face 202 of the casing 209 by way of example.

With the above configuration, the antenna apparatus 2160 according to the fourth variant can transmit or receive a plurality of polarized waves with mutually different polarization directions also in a case where the dipole antennas 2161 capable of transmitting or receiving only one polarized wave are applied.

Additionally, if one or more dipole antennas 2161a and 2161b are each provided, the numbers of dipole antennas 2161a and 2161 b are not particularly limited. However, it is desirable that a plurality of dipole antennas 2161a and 2161b is each provided as in the communication apparatus 213 according to the first variant in a case where beam forming is used.

An exemplary configuration of the antenna apparatus has been described above according to the fourth variant with reference to FIG. 12 and FIG. 13 in a case where dipole antennas are used as antenna devices.

(Fifth Variant: Exemplary Configuration in a Case where Notch Antenna is Applied)

An exemplary configuration of an antenna apparatus according to a fifth variant will be subsequently described in a case where a notch antenna is applied as an antenna device.

Figure 14:
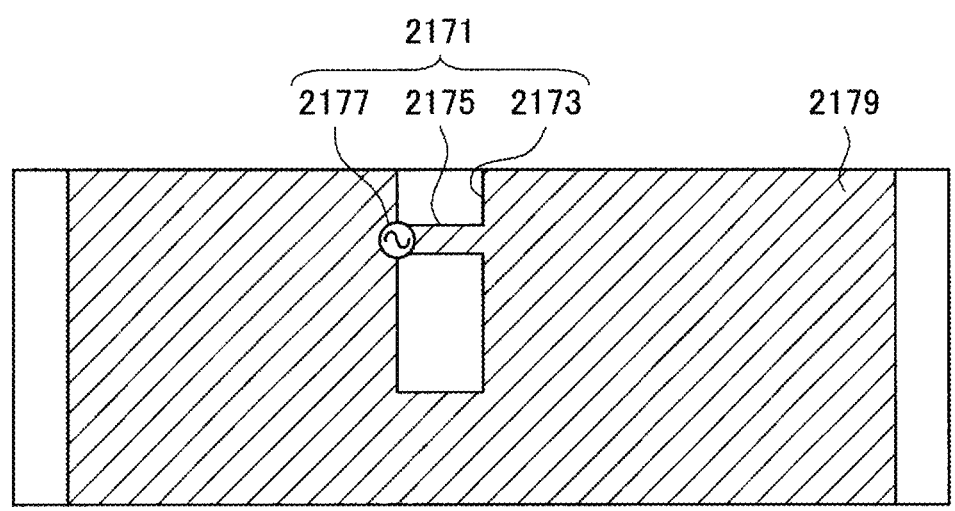
FIG. 14 is an explanatory diagram for explaining an outline of a notch antenna.

An outline of a notch antenna will be first described with reference to FIG. 14. FIG. 14 is an explanatory diagram for explaining an outline of a notch antenna.

As illustrated in FIG. 14, a notch antenna 2171 is configured of a slit 2173 formed on a ground plane 2179 including a conductive material, a power supply line 2175 provided to cross the slit 2173, and a power supply point 2177 provided at one end of the power supply line 2175. With the configuration, a current flows along the power supply line 2175 provided to cross the slit 2173 in response to power supplied from the power supply point 2177 in the notch antenna 2171. That is, the notch antenna 2171 can transmit or receive a polarized wave the polarization direction of which substantially matches with a direction in which the power supply line 2175 extends.

Figure 15:
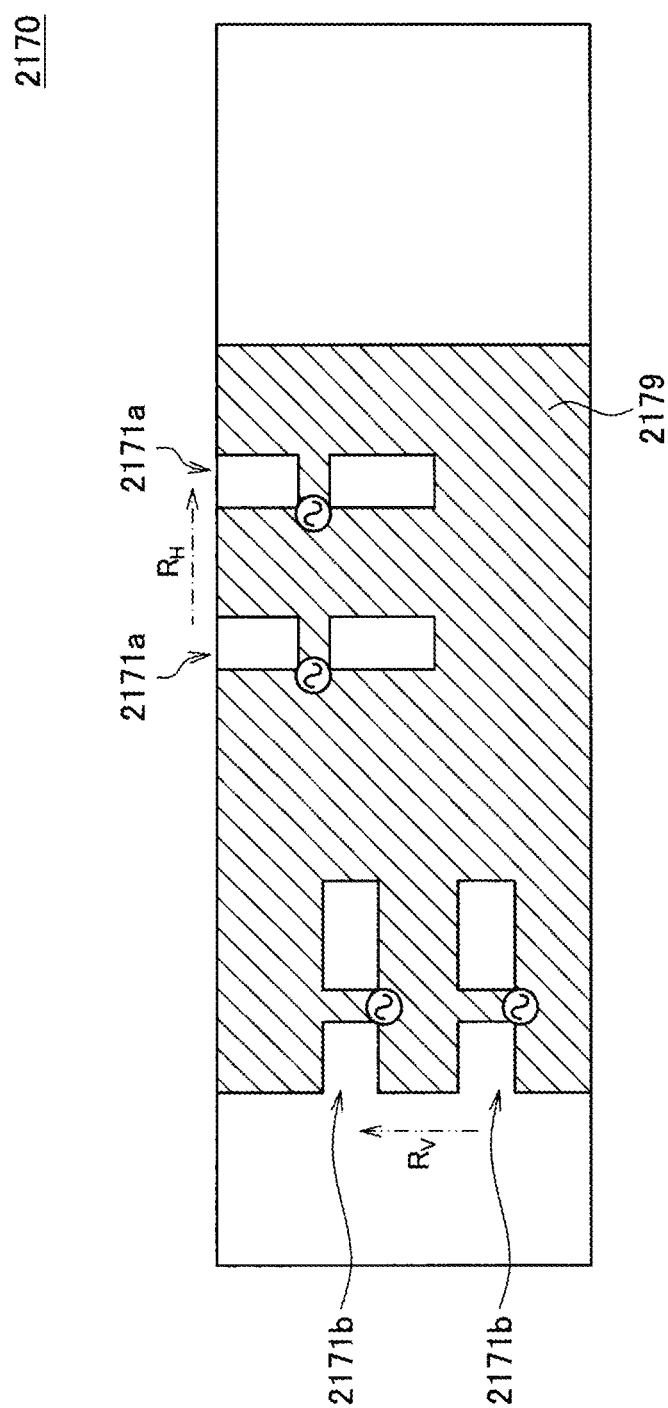
FIG. 15 is a diagram illustrating an exemplary configuration of an antenna apparatus according to a fifth variant.

An exemplary configuration of an antenna apparatus in which the notch antenna 2171 described with reference to FIG. 14 is applied as an antenna device will be described with reference to FIG. 15 according to the above description. FIG. 15 is a diagram illustrating an exemplary configuration of an antenna apparatus according to the fifth variant. Additionally, FIG. 15 illustrates an exemplary schematic configuration of an antenna apparatus 2170 viewed in the normal direction of a face in a case where the antenna apparatus 2170 according to the fifth variant is held to be positioned near the face (such as part of the outer faces of the casing 209). That is, the antenna apparatus 2170 illustrated in FIG. 15 mainly transmits or receives wireless signals propagating in a direction substantially matching with the depth direction of FIG. 15.

As described above, the notch antenna 2171 can transmit or receive a polarized wave the polarization direction of which substantially matches with the direction in which the power supply line 2175 provided to cross the slit 2173 formed on the ground plane 2179 including a conductive material extends. Thus, a plurality of slits extending in mutually different directions is provided on the ground plane 2179 so that the antenna apparatus 2170 illustrated in FIG. 15 is provided with a plurality of notch antennas 2171 (or notch antennas 2171a and 2171b).

Specifically, the notch antenna 2171a is formed with the slit 2173 to vertically extend in FIG. 15, and is provided with the power supply line 2175 to cross the slit 2173. That is, the notch antenna 2171a can transmit or receive the polarized wave $R_H$ the polarization direction of which substantially matches with the horizontal direction of FIG. 15 in wireless signals transmitted or received by the antenna apparatus 2170.

To the contrary, the notch antenna 2171b is formed with the slit 2173 to horizontally extend in FIG. 15, and is provided with the power supply line 2175 to cross the slit 2173. That is, the notch antenna 2171b can transmit or receive the polarized wave $R_V$ the polarization direction of which substantially matches with the vertical direction of FIG. 15 in wireless signals transmitted or received by the antenna apparatus 2170.

With the above configuration, the antenna apparatus 2170 according to the fifth variant can transmit or receive a plurality pf polarized waves with mutually different polarization directions also in a case where the notch antennas 2171 capable of transmitting or receiving only one polarized wave are applied.

Additionally, if one or more notch antennas 2171a and 2171b are each formed, the numbers of notch antennas 2171a and 2171b are not particularly limited. However, it is desirable that a plurality of notch antennas 2171a and 2171b is each formed, as in the communication apparatus 213 according to the first variant in a case where beam forming is used.

An exemplary configuration of the antenna apparatus has been described above according to the fifth variant with reference to FIG. 14 and FIG. 15 in a case where notch antennas are applied as antenna devices.

(Sixth Variant: Exemplary Configuration in a Case where Monopole Antenna is Applied)

An exemplary configuration of an antenna apparatus will be subsequently described according to a sixth variant in a case where a monopole antenna is applied as an antenna device.

Figure 16:
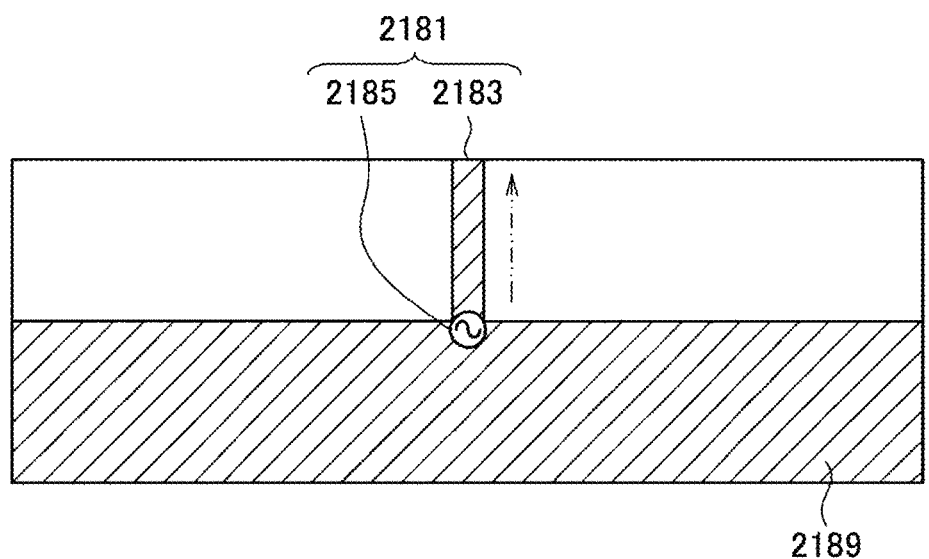
FIG. 16 is an explanatory diagram for explaining an outline of a monopole antenna.

An outline of a monopole antenna will be first described with reference to FIG. 16. FIG. 16 is an explanatory diagram for explaining an outline of a monopole antenna.

As illustrated in FIG. 16, a monopole antenna 2181 is configured of a rod-shaped element 2183 formed to extend from a ground plane 2189 including a conductive material, and a power supply point 2185 provided to be positioned on an end of the element 2183 closer to the ground plane 2189. With the configuration, a current flows along the rod-shaped element 2183 in response to power supplied from the power supply point 2185 in the monopole antenna 2181. That is, the monopole antenna 2181 can transmit or receive a polarized wave the polarization direction of which substantially matches with a direction in which the rod-shaped element 2183 extends.

Figure 17:
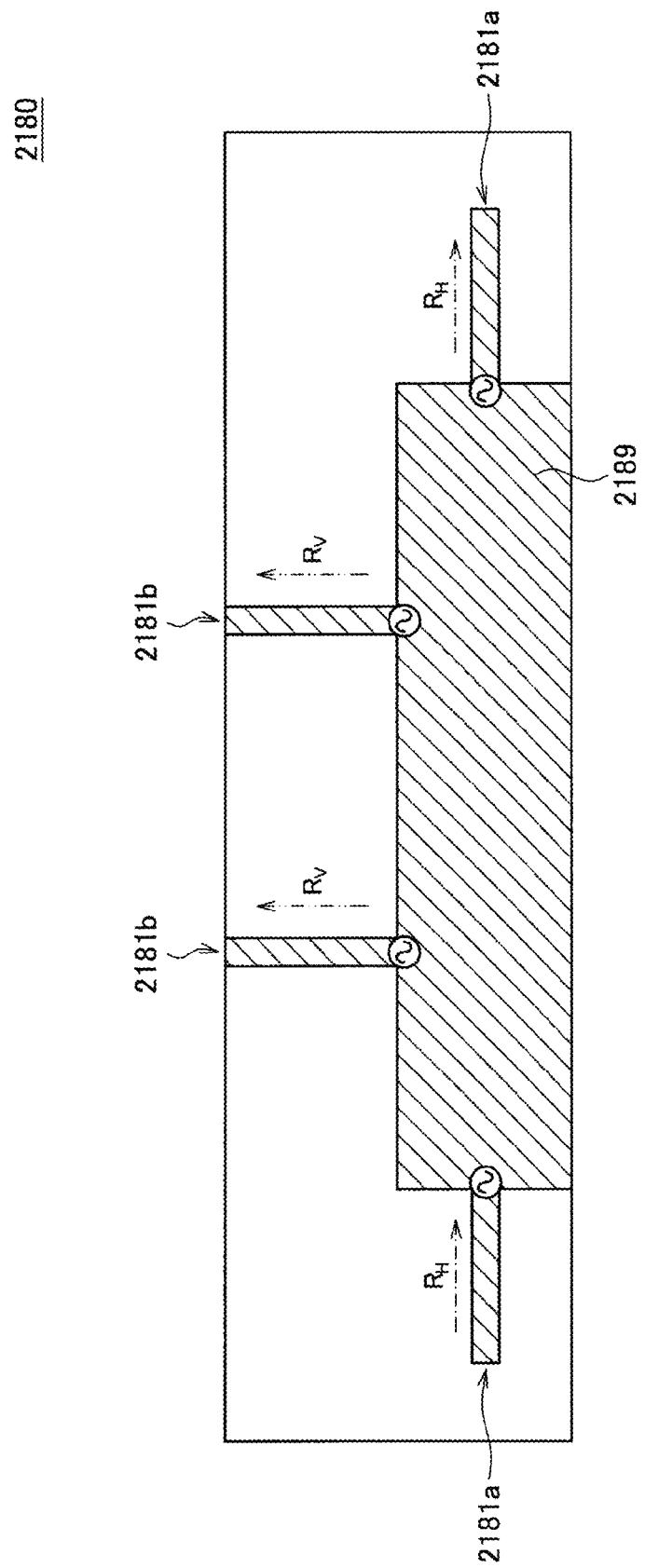
FIG. 17 is a diagram illustrating an exemplary configuration of an antenna apparatus according to a sixth variant.

An exemplary configuration of an antenna apparatus in which the monopole antenna 2181 described with reference to FIG. 16 is applied as an antenna device will be described with reference to FIG. 17 according to the above description. FIG. 17 is a diagram illustrating an exemplary configuration of an antenna apparatus according to the sixth variant. Additionally, FIG. 17 illustrates an exemplary schematic configuration of an antenna apparatus 2180 viewed in the normal direction of a face in a case where the antenna apparatus 2180 according to the sixth variant is held to be positioned near the face (such as part of the outer faces of the casing 209). That is, the antenna apparatus 2180 illustrated in FIG. 17 mainly transmits or receives wireless signals propagating in a direction substantially matching with the depth direction of FIG. 17.

As described above, the monopole antenna 2181 can transmit or receive a polarized wave the polarization direction of which substantially matches with the direction in which the rod-shaped element 2183 extends. In other words, a current flows in the rod-shaped element 2183 in one direction, and thus the monopole antenna 2181 itself can transmit or receive only one polarized wave. On the other hand, a plurality of antenna devices is arranged in consideration of the directions of polarized waves transmittable or receivable by the respective antenna devices on the basis of the similar spirit to the third variant, thereby transmitting or receiving polarized waves with mutually different polarization directions similarly to the patch antenna. Thus, a plurality of monopole antennas 2181 (or monopole antennas 2181a and 2181b) is provided to be able to transmit or receive polarized waves with mutually different polarization directions in the antenna apparatus 2180 illustrated in FIG. 17.

Specifically, the monopole antenna 2181a is formed with the rod-shaped element 2183 to horizontally extend in FIG. 17. That is, the monopole antenna 2181a can transmit or receive the polarized wave $R_H$ the polarization direction of which substantially matches with the horizontal direction of FIG. 17 in wireless signals transmitted or received by the antenna apparatus 2180.

To the contrary, the monopole antenna 2181b is formed with the rod-shaped element 2183 to vertically extend in FIG. 17. That is, the monopole antenna 2181b can transmit or receive the polarized wave $R_V$ the polarization direction of which substantially matches with the vertical direction of FIG. 17 in wireless signals transmitted or received by the antenna apparatus 2180.

With the above configuration, the antenna apparatus 2180 according to the sixth variant can transmit or receive a plurality of polarized waves with mutually different polarization directions also in a case where the monopole antennas 2181 capable of transmitting or receiving only one polarized wave are applied.

Additionally, if one or more monopole antennas 2181a and 2181b are each provided, the numbers of monopole antennas 2181a and 2181b are not particularly limited. However, it is desirable that a plurality of monopole antennas 2181a and 2181b is each provided as in the communication apparatus 213 according to the first variant in a case where beam forming is used.

An exemplary configuration of the antenna apparatus has been described above according to the sixth variant with reference to FIG. 16 and FIG. 17 in a case where monopole antennas are applied as antenna devices.

(Seventh Variant: Exemplary Configuration in a Case where Inverted F-Antenna is Applied)

An exemplary configuration of an antenna apparatus according to a seventh variant will be subsequently described in a case where an inverted F-antenna is applied as an antenna device.

Figure 18:
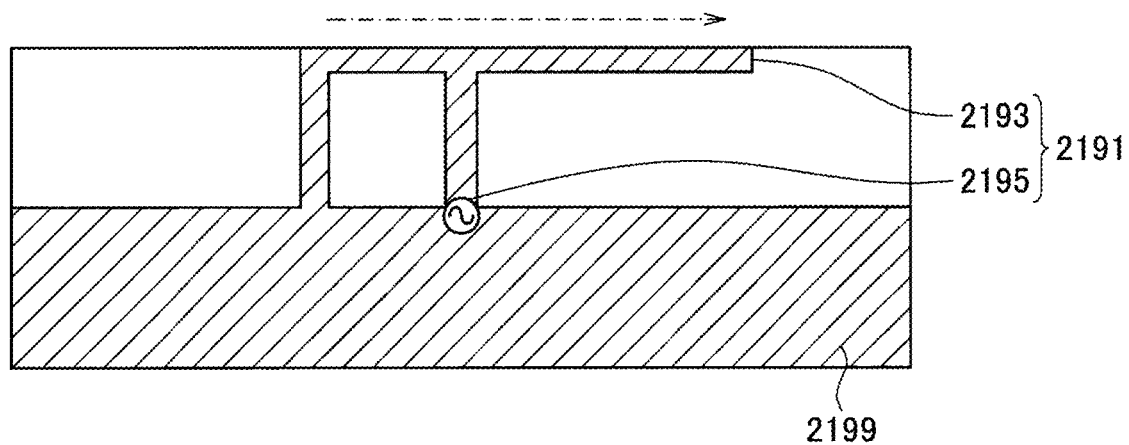
FIG. 18 is an explanatory diagram for explaining an outline of an inverted F-antenna.

An outline of an inverted F-antenna will be first described with reference to FIG. 18. FIG. 18 is an explanatory diagram for explaining an outline of an inverted F-antenna.

As illustrated in FIG. 18, an inverted F-antenna 2191 includes an F-shaped element 2193 and a power supply point 2195. The F-shaped element 2193 is configured of a rod-shaped part separated from an end of a ground plane 2199 and extending along the end, and a part for crossing the rod-shaped part and the ground plane 2199 at two positions of one end of the rod-shaped part. Further, the F-shaped element 2193 is provided with the power supply point 2195 at one of the parts connected with the ground plane 2199, and the other part operates as a short-circuit point. With the configuration, a current flows along the rod-shaped part separated from an end of the ground plane 2199 and extending along the end in the F-shaped element 2193 in the inverted F-antenna 2191. That is, the inverted F-antenna 2191 can transmit or receive a polarized wave the polarization direction of which substantially matches with a direction in which the rod-shaped part extends.

Figure 19:
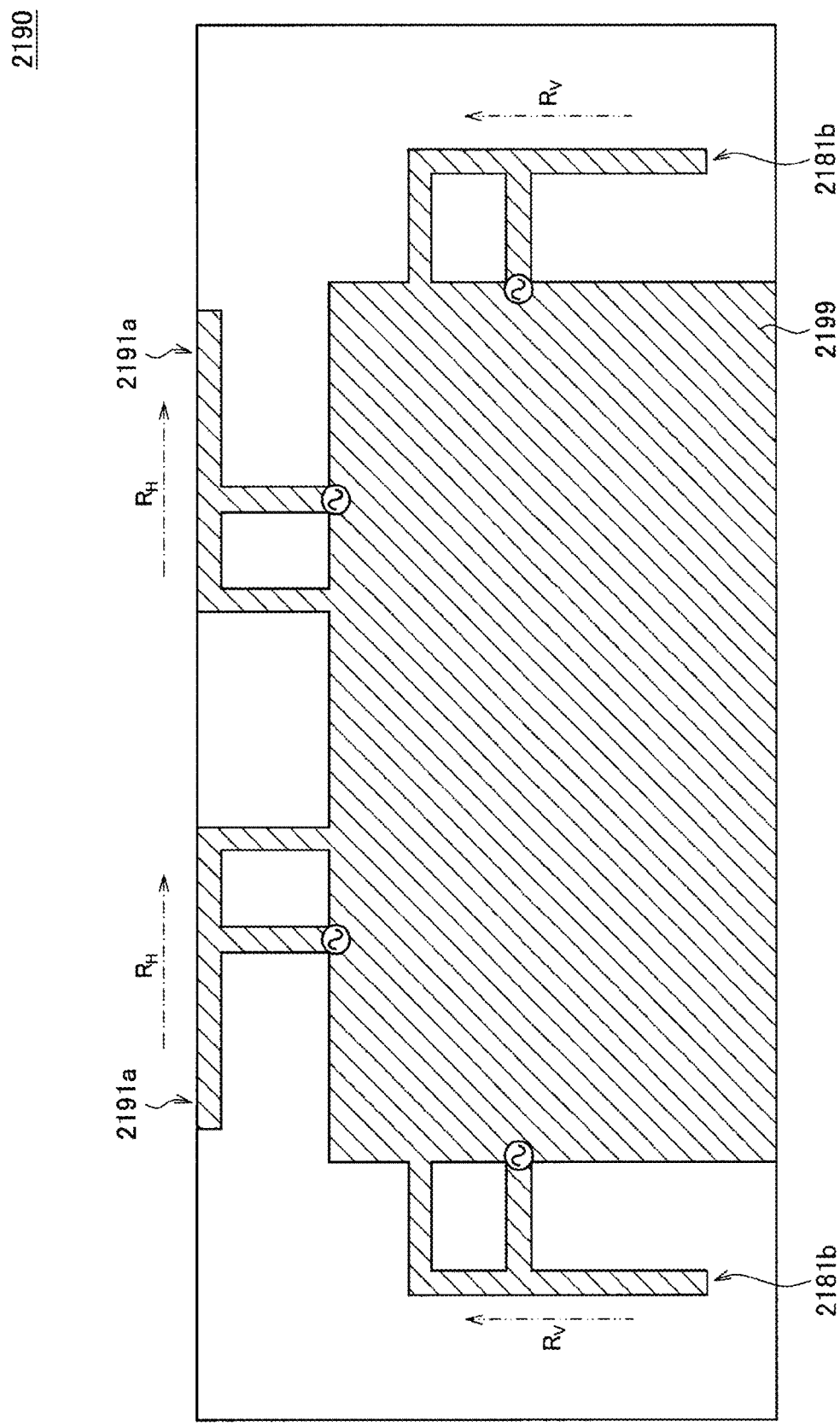
FIG. 19 is a diagram illustrating an exemplary configuration of an antenna apparatus according to a seventh variant.

An exemplary configuration of an antenna apparatus in which the inverted F-antenna 2191 described with reference to FIG. 18 is applied as an antenna device will be described with reference to FIG. 19 according to the above description. FIG. 19 is a diagram illustrating an exemplary configuration of an antenna apparatus according to the seventh variant. Additionally, FIG. 19 illustrates an exemplary schematic configuration of an antenna apparatus 2190 viewed in the normal direction of a face in a case where the antenna apparatus 2190 according to the seventh variant is held to be positioned near the face (such as part of the outer faces of the casing 209). That is, the antenna apparatus 2190 illustrated in FIG. 19 mainly transmits or receives wireless signals propagating in a direction substantially matching with the depth direction of FIG. 19.

As described above, the inverted F-antenna 2191 can transmit or receive a polarized wave the polarization direction of which substantially matches with the direction in which the rod-shaped part separated from an end of the ground plane 2199 and extending along the end extends in the F-shaped element 2193. In other words, a current flows in the rod-shaped part in one direction and thus the inverted F-antenna 2191 itself can transmit or receive only one polarized wave. On the other hand, a plurality of antenna devices is arranged in consideration of the directions of polarized waves transmittable or receivable by the respective antenna devices on the basis of the similar spirit to the third variant, thereby transmitting or receiving polarized waves with mutually different polarization directions similarly to the patch antenna. Thus, a plurality of inverted F-antennas 2191 (or inverted F-antennas 2191a and 2191b) is provided to be able to transmit or receive polarized waves with mutually different polarization directions in the antenna apparatus 2190 illustrated in FIG. 19.

Specifically, the inverted F-antenna 2191a is arranged such that the direction of the rod-shaped part separated from an end of the ground plane 2199 and extending along the end extends substantially matches with the horizontal direction of FIG. 19 in the F-shaped element 2193. That is, the inverted F-antenna 2191a can transmit or receive the polarized wave $R_N$ the polarization direction of which substan-tially matches with the horizontal direction of FIG. 19 in wireless signals transmitted or received by the antenna apparatus 2190.

To the contrary, the inverted F-antenna 2191b is arranged such that the direction in which the rod-shaped part separated from an end of the ground plane 2199 and extending along the end extends substantially matches with the vertical direction of FIG. 19 in the F-shaped element 2193. That is, the inverted F-antenna 2191b can transmit or receive the polarized wave $R_V$ the polarization direction of which substantially matches with the vertical direction of FIG. 19 in wireless signals transmitted or received by the antenna apparatus 2190.

With the above configuration, the antenna apparatus 2190 according to the seventh variant can transmit or receive a plurality of polarized waves with mutually different polarization directions in a case where the inverted F-antennas 2191 capable of transmitting or receiving only one polarized wave are applied.

Additionally, if one or more inverted F-antennas 2191a and 2191b is each provided, the numbers of inverted F-antennas 2191a and 2191b are not particularly limited. However, it is desirable that a plurality of inverted F-antennas 2191a and 2191b is each provided as in the communication apparatus 213 according to the first variant in a case where beam forming is used.

An exemplary configuration of the antenna apparatus according to the seventh variant has been described above with reference to FIG. 18 and FIG. 19 in a case where the inverted F-antennas are applied as antenna devices.

(Eighth Variant: Exemplary Configuration in a Case where Loop Antenna is Applied)

An exemplary configuration of an antenna apparatus according to an eighth variant will be subsequently described in a case where a loop antenna is applied as an antenna device.

Figure 20:
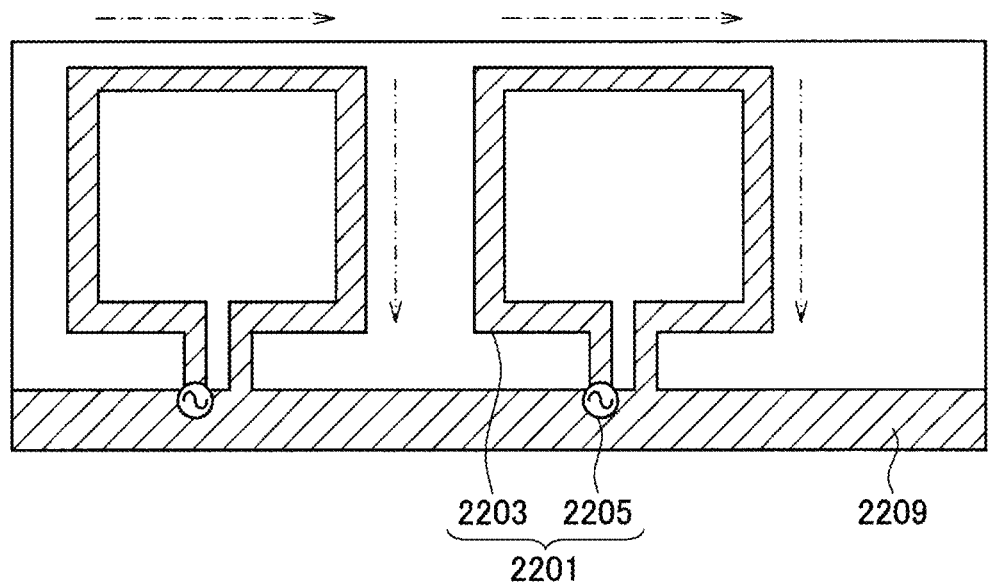
FIG. 20 is an explanatory diagram for explaining an outline of a loop antenna.

An outline of a loop antenna will be first described with reference to FIG. 20. FIG. 20 is an explanatory diagram for explaining an outline of a loop antenna.

As illustrated in FIG. 20, a loop antenna 2201 is configured of an annular (loop-shaped) element 2203 and a power supply point 2205. The element 2203 is formed as an annular (loop-shaped) coil with an elongated conductor, and its respective ends are connected to a ground plane 2209 at mutually different positions. Further, the power supply point 2205 is provided at one end of the respective ends (or the ends connected to the ground plane 2209) of the element 2203. With the configuration, a current flows in a direction in which the annular element 2203 extends in the loop antenna 2201. With the property, the loop antenna 2201 can transmit or receive two polarized waves with mutually different polarization directions depending on the shape of the element 2203, but only one power supply point 2205 is provided and thus the two polarized waves are difficult to discriminate.

Figure 21:
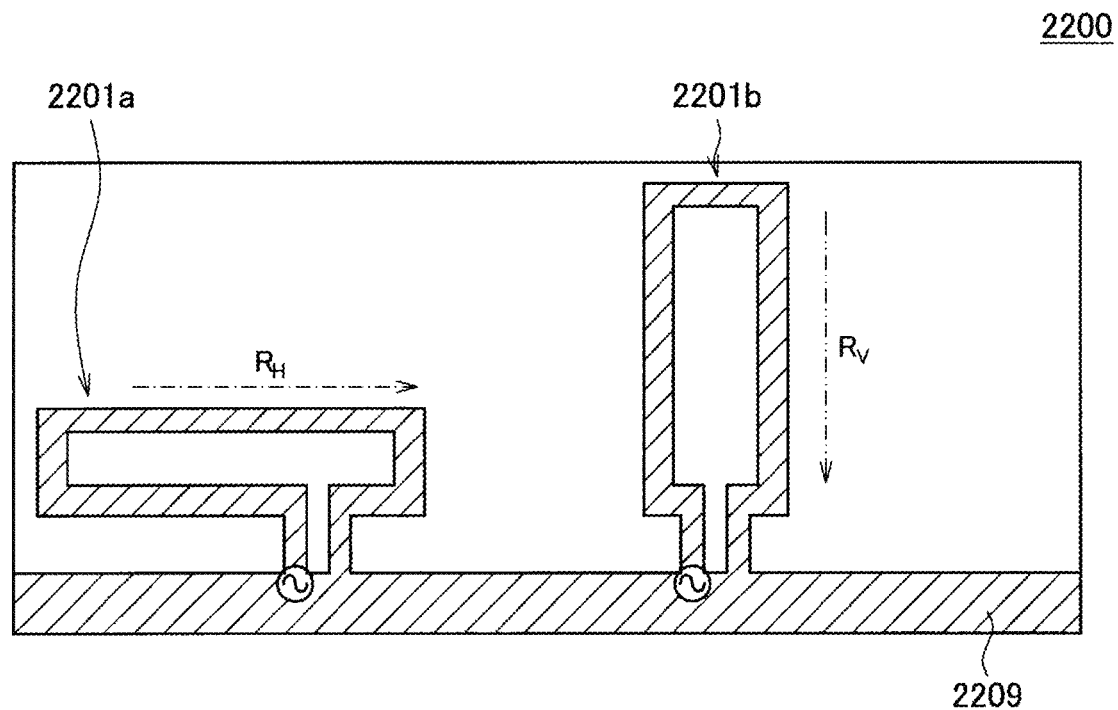
FIG. 21 is a diagram illustrating an exemplary configuration of an antenna apparatus according to an eighth variant.

An exemplary configuration of an antenna apparatus in which the loop antenna 2201 described with reference to FIG. 20 is applied as an antenna device will be described with reference to FIG. 21 according to the above description. FIG. 21 is a diagram illustrating an exemplary configuration of an antenna apparatus according to the eighth variant. Additionally, FIG. 21 illustrates an exemplary schematic configuration of an antenna apparatus 2200 viewed in the normal direction of a face in a case where the antenna apparatus 2200 according to the eighth variant is held to be positioned near the face (such as part of the outer faces of the casing 209). That is, the antenna apparatus 2200 illustrated in FIG. 21 mainly transmits or receives wireless signals propagating in a direction substantially matching with the depth direction of FIG. 21.

As illustrated in FIG. 21, the element 2203 forms a square loop and a plurality of loop antennas 2201 (or loop antennas 2201a and 2201b) with mutually different aspect ratios of the element 2203 is provided in the antenna apparatus 2200.

Specifically, the loop antenna 2201a is formed with the element 2203 such that a direction in which the ground plane 2209 extends (or the horizontal direction of FIG. 21) is the longitudinal direction. Thereby, the loop antenna 2201a more dominantly transmits or receives the polarized wave $R_H$ the polarization direction of which substantially matches with the longitudinal direction than the polarized wave $R_V$ the polarization direction of which substantially matches with the short direction. That is, the loop antenna 2201a can transmit or receive the polarized wave $R_H$ in wireless signals transmitted or received by the antenna apparatus 219).

To the contrary, the loop antenna 2201b is formed with the element 2203 such that a direction (or the vertical direction of FIG. 21) orthogonal to the direction in which the ground plane 2209 extends is the longitudinal direction. Thereby, the loop antenna 2201b more dominantly transmits or receives the polarized wave $R_v$ the polarization direction of which substantially matches with the longitudinal direction than the polarized wave $R_H$ the polarization direction of which substantially matches with the short direction. That is, the loop antenna 2201b can transmit or receive the polarized wave $R_V$ in wireless signals transmitted or received by the antenna apparatus 2190.

With the above configuration, the antenna apparatus 2200 according to the eighth variant can discriminate and transmit or receive each of a plurality of polarized waves with mutually different polarization directions also in a case where the loop antennas 2201 are applied.

Additionally, if one or more loop antennas 2201a and 2201b are each provided, the numbers of loop antennas 2201a and 2201b are not particularly limited. However, it is desirable that a plurality of loop antennas 2201a and 2201b are each provided as in the communication apparatus 213 according to the first variant in a case where beam forming is used.

An exemplary configuration of the antenna apparatus according to the eighth variant has been described above with reference to FIG. 20 and FIG. 21 in a case where the loop antennas are applied as antenna devices.

(Ninth Variant: Exemplary Configuration in a Case where Slot Antenna is Applied)

An exemplary configuration of an antenna apparatus according to a ninth variant will be subsequently described in a case where a slot antenna is applied as an antenna device.

Figure 22:
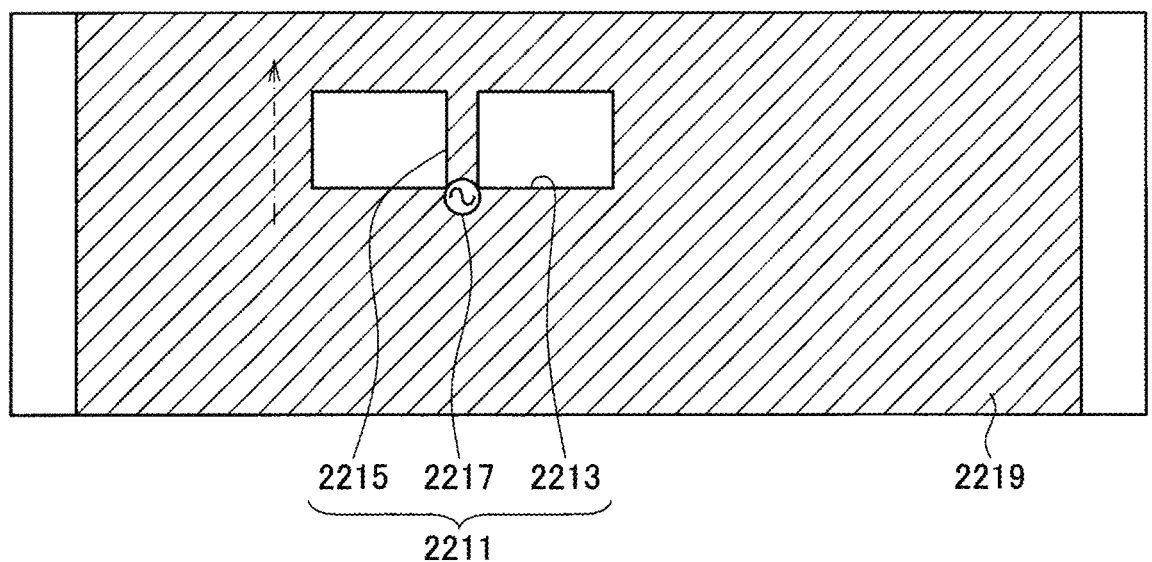
FIG. 22 is an explanatory diagram for explaining an outline of a slot antenna.

An outline of a slot antenna will be first described with reference to FIG. 22. FIG. 22 is an explanatory diagram for explaining an outline of a slot antenna.

As illustrated in FIG. 22, a slot antenna 2211 is configured of an elongated slot 2213 (or elongated cutout) formed on a ground plane 2219 including a conductive material, a power supply line 2215, and a power supply point 2217. The power supply line 2215 is provided to cross the ends extending in the longitudinal direction of the slot 2213. Further, the power supply point 2217 is provided at one end of the power supply line 2215. With the configuration, a current flows along the power supply line 2215 provided to cross the slot 2213 in the slot antenna 2211. That is, the slot antenna 2211 can transmit or receive a polarized wave the polarization direction of which substantially matches with a direction in which the power supply line 2215 extends.

Figure 23:
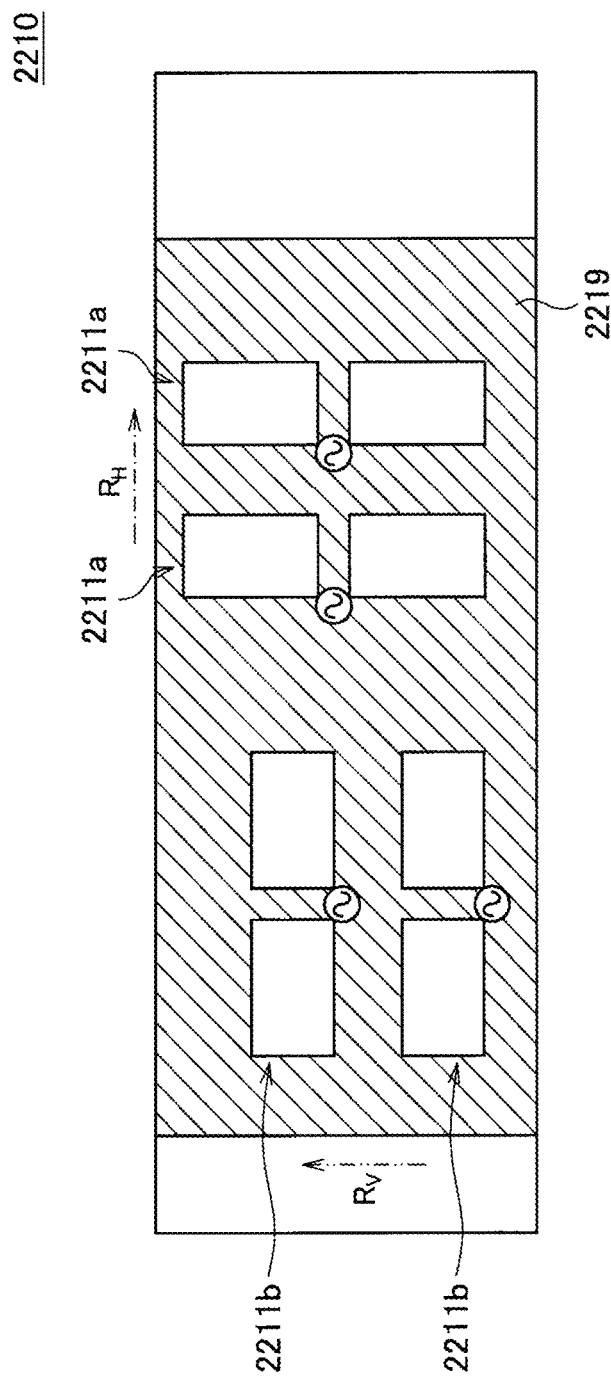
FIG. 23 is a diagram illustrating an exemplary configuration of an antenna apparatus according to a ninth variant.

An exemplary configuration of an antenna apparatus in which the slot antenna 2211 described with reference to FIG. 22 is applied as an antenna device will be described with reference to FIG. 23 according to the above description. FIG. 23 is a diagram illustrating an exemplary configuration of an antenna apparatus according to the ninth variant. Additionally, FIG. 23 illustrates an exemplary schematic configuration of an antenna apparatus 2210 viewed in the normal direction of a face in a case where the antenna apparatus 2210 according to the ninth variant is held to be positioned near the face (such as part of the outer faces of the casing 209). That is, the antenna apparatus 2210 illustrated in FIG. 23 can transmit or receive wireless signals propagating in a direction substantially matching with the depth direction of FIG. 23.

As described above, the slot antenna 2211 can transmit or receive a polarized wave the polarization direction of which substantially matches with the direction in which the power supply line 2215 provided to cross the slot 2213 formed on the ground plane 2219 including a conductive material extends. Thus, a plurality of slots extending in mutually different directions is provided on the ground plane 2219, and thus the antenna apparatus 2210 illustrated in FIG. 23 is provided with a plurality of slot antennas 2211 (or slot antennas 2211a and 2211b).

Specifically, the slot antenna 2211a is formed with the slot 2213 extending in the vertical direction of FIG. 23, and is provided with the power supply line 2215 to cross the slot 2213. That is, the slot antenna 2211a can transmit or receive the polarized wave $R_f$ the polarization direction of which substantially matches with the horizontal direction of FIG. 23 in wireless signals transmitted or received by the antenna apparatus 2210.

To the contrary, the slot antenna 2211b is formed with the slot 2213 extending in the horizontal direction of FIG. 23, and is provided with the power supply line 2215 to cross the slot 2213. That is, the slot antenna 2211b can transmit or receive the polarized wave $R_V$ the polarization direction of which substantially matches with the vertical direction of FIG. 23 in wireless signals transmitted or received by the antenna apparatus 2210.

With the above configuration, the antenna apparatus 2210 according to the ninth variant can transmit or receive a plurality of polarized waves with mutually different polarization directions also in a case where the slot antennas 2211 capable of transmitting or receiving only one polarized wave are applied.

Additionally, if one or more slot antennas 2211a and 2211b are each formed, the numbers of slot antennas 2211a and 2211b are not particularly limited. However, it is desirable that a plurality of slot antennas 2211a and 2211b is each formed as in the communication apparatus 213 according to the first variant in a case where beam forming is used.

An exemplary configuration of the antenna apparatus according to the eighth variant has been described above with reference to FIG. 22 and FIG. 23 in a case where the loop antennas are applied as antenna devices.

3.4. EXAMPLES

Examples of the communication apparatus (such as the terminal apparatus 200) according to the present embodiment will be subsequently described. As described above, a millimeter wave tends to be easily reflected on a human body. To the contrary, a portable communication apparatus (such as the terminal apparatus 200) such as Smartphone is used while its casing is being held in a hand in many cases. Thus, when a communication path directly connecting an antenna device provided in a terminal apparatus and a base station is blocked by a site such as a hand holding the casing of the terminal apparatus, a millimeter wave propagating in the communication path is blocked by the site such as a hand. Exemplary antenna apparatus installation positions will be described according to the present examples in terms of such a situation assuming that a user holds a terminal apparatus.

First Example: First Exemplary Configuration Assuming Vertical Holding

Figure 24:
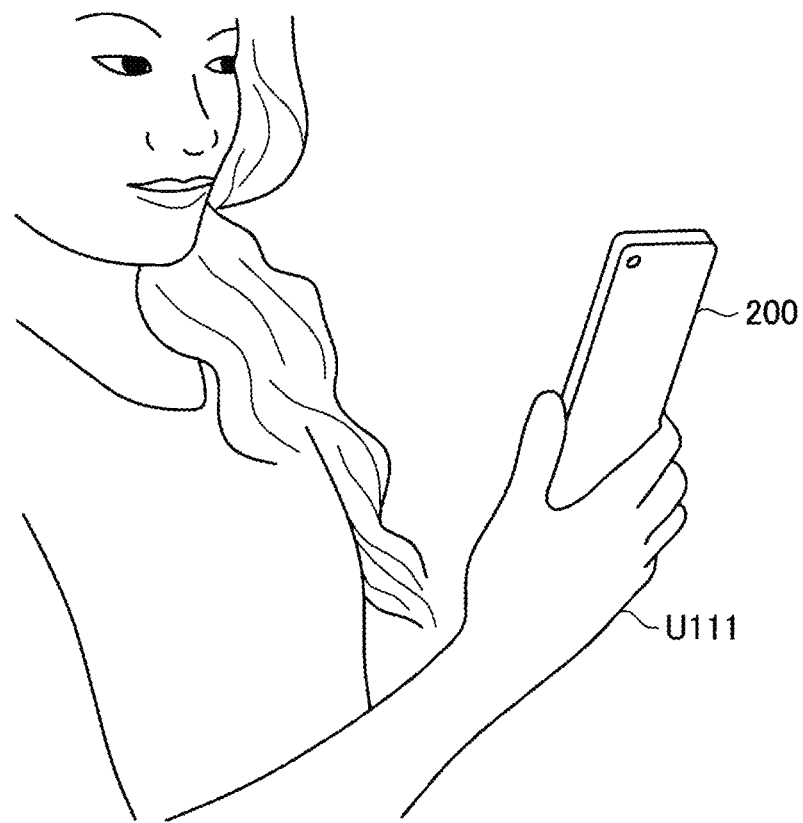
FIG. 24 is an explanatory diagram for explaining an outline of a communication apparatus according to a first example.
Figure 25:
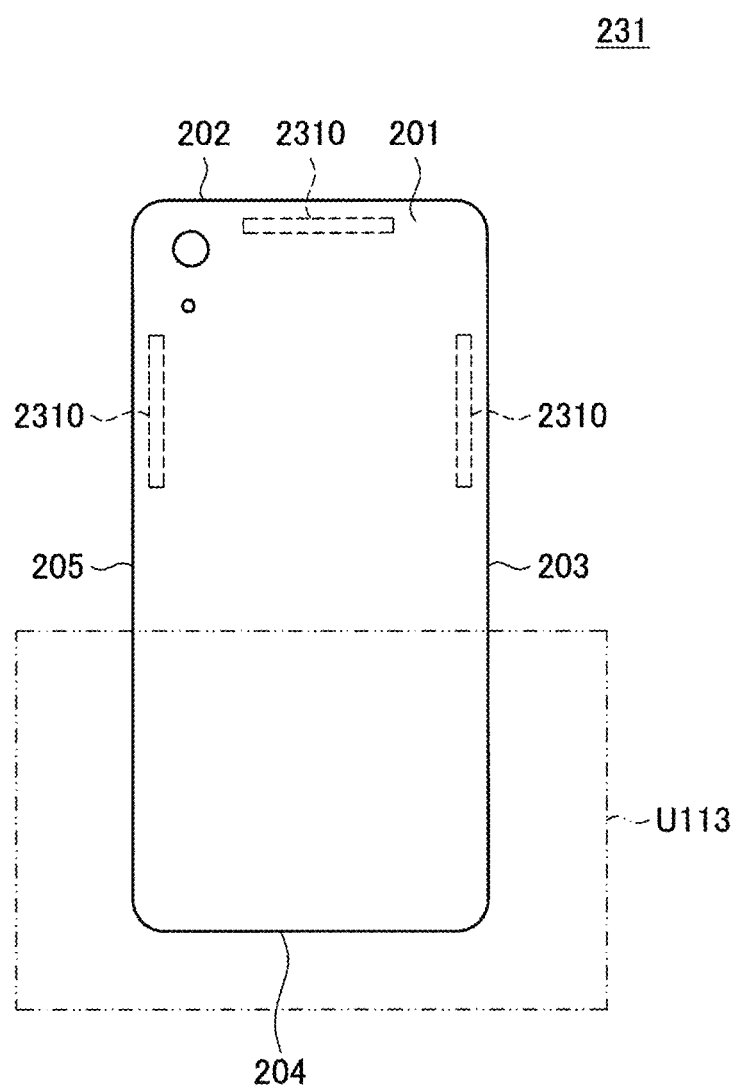
FIG. 25 is an explanatory diagram for explaining an outline of the communication apparatus according to the first example.

An exemplary antenna apparatus installation position according to a first example will be first described with reference to FIG. 24 and FIG. 25 assuming that a communication apparatus is vertically held. FIG. 24 and FIG. 25 are explanatory diagrams for explaining an outline of a communication apparatus according to the first example. Additionally. "vertical holding" in the following description indicates that a communication apparatus including a casing with a substantially rectangular face such as the terminal apparatus 200 is held such that that the longitudinal direction of the face substantially matches with the vertical direction of a user. Further, to the contrary, how the communication apparatus is held such that the longitudinal direction of the face substantially matches with the horizontal direction of the user is also called "horizontal holding".

For example, FIG. 24 illustrates how a communication apparatus (such as the terminal apparatus 200) such as Smartphone is vertically held by way of example. Specifically, in the example illustrated in FIG. 24, the user holds the lower end in the longitudinal direction of the casing 209 of the terminal apparatus 200 by a hand U111.

Further, FIG. 25 is a diagram schematically illustrating a part blocked by a user's hand in the respective parts of the terminal apparatus 200 in a case where the terminal apparatus 200 is held as illustrated in FIG. 24. Additionally, the communication apparatus according to the first example may be denoted as "communication apparatus 231" in the following description in order to discriminate from the communication apparatuses according to the above embodiment and the respective variants or the communication apparatuses according to the other examples.

The reference numerals 201 to 205 in FIG. 25 correspond to the backside 201 and the end faces 202 to 205 of the casing 209, respectively, in the example described with reference to FIG. 5. Further, a reference numeral U113 schematically illustrates a region blocked by a users hand (or the hand U111 illustrated in FIG. 24).

That is, particularly in a case where the lower part is held as illustrated in FIG. 24 while the communication apparatus 231 is vertically held, even if an antenna apparatus is provided in the region U113, a millimeter wave is difficult to transmit or receive by the antenna apparatus. Assuming the case, an antenna apparatus may be provided at an upper part in a case where the communication apparatus 231 is vertically held as illustrated in FIG. 25, for example. For example, a reference numeral 2310 in FIG. 25 schematically illustrates an antenna apparatus provided in the communication apparatus 231 according to the present example.

Further, in the example illustrated in FIG. 25, even if an antenna apparatus is installed in the region U113, the antenna apparatus hardly contributes to an enhancement in communication property in communication using millimeter waves. Thus, assuming that the communication apparatus 231 is held as illustrated in FIG. 24, an antenna apparatus positioned within the region U113 illustrated in FIG. 25 may be temporarily disabled or an antenna apparatus may not be provided within the region U113, for example. Additionally, which part of the casing 209 the user holds can be dynamically recognized by use of a sensor for detecting an approach of a human body such as capacitive sensor, for example. Further, an orientation (or vertical holding or horizontal holding) of the casing 209 can be dynamically recognized by use of various sensors such as gravity sensor, acceleration sensor, and angular speed sensor, for example.

Additionally, the vertical direction may be explicitly determined in a case where a communication apparatus such as Smartphone is vertically held. As a specific example, in a case where the vertical direction of a communication apparatus is explicitly determined while the communication apparatus is vertically held, the screen displayed on the display is not inverted and the display is maintained even if the vertical direction is inverted, for example. With the configuration, it is expected that the user holds the communication apparatus such that the vertical direction of the communication apparatus substantially matches with the vertical direction of the user in many cases while he/she vertically holds the communication apparatus.

In a case where the vertical direction of the communication apparatus is explicitly determined in vertical holding in this way, it is better that at least one antenna apparatus 2310 is held to be positioned on the upper side of the communication apparatus while the communication apparatus is vertically held.

Further, the lower half of a communication apparatus is held in many cases while the communication apparatus is vertically held. Assuming the case, it is better that the antenna apparatus 2310 positioned in the horizontal direction of the communication apparatus is held to be positioned on the upper half side of the communication apparatus while the communication apparatus is vertically held, for example.

An exemplary antenna apparatus installation position according to the first example has been described above with reference to FIG. 24 and FIG. 25 assuming that a communication apparatus is vertically held.

Second Example: Second Exemplary Configuration Assuming Vertical Holding

Figure 26:
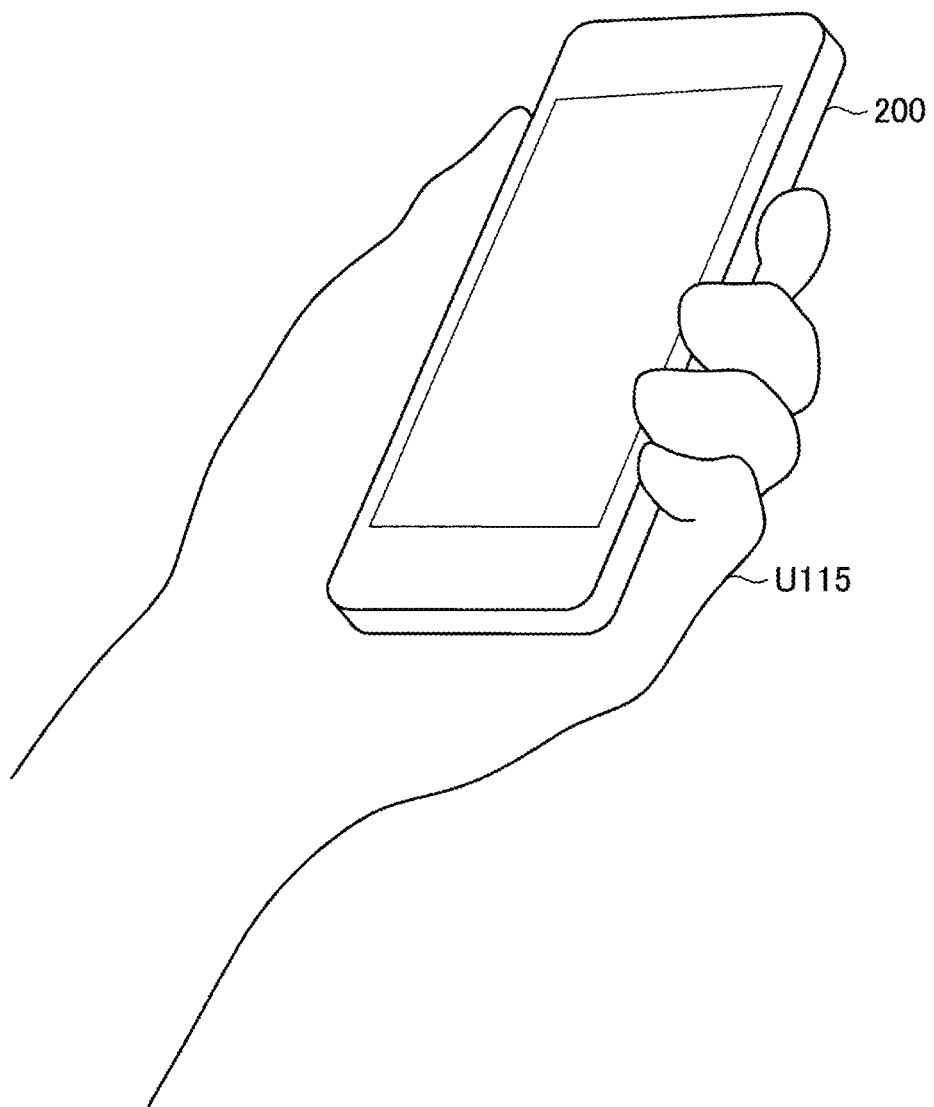
FIG. 26 is an explanatory diagram for explaining an outline of a communication apparatus according to a second example.
Figure 27:
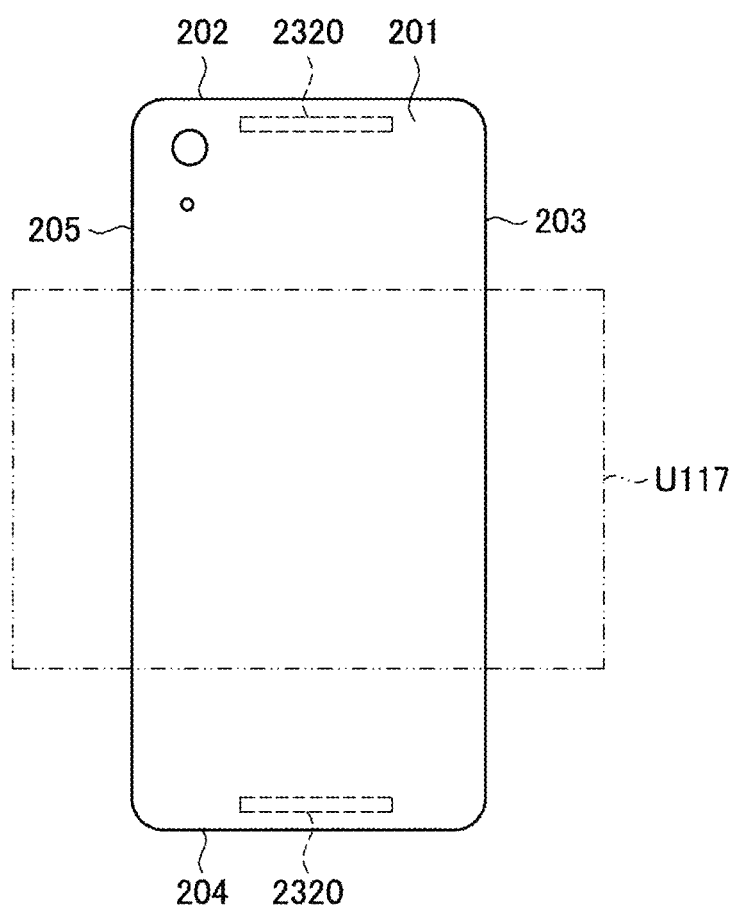
FIG. 27 is an explanatory diagram for explaining an outline of the communication apparatus according to the second example.

Other exemplary antenna apparatus installation position assuming that a communication apparatus is vertically held will be subsequently described according to a second example with reference to FIG. 26 and FIG. 27. FIG. 26 and FIG. 27 are explanatory diagrams for explaining an outline of a communication apparatus according to the second example.

For example, FIG. 26 illustrates other example in which a communication apparatus (such as the terminal apparatus 200) such as Smartphone is vertically held. Specifically, in the example illustrated in FIG. 26, the user grips around the centers of both ends in the short direction of the casing 209 of the terminal apparatus 200 with a hand U115.

Further, FIG. 27 is a diagram schematically illustrating a part blocked by a user's hand in the respective parts of the terminal apparatus 200 in a case where the terminal apparatus 200 is held as illustrated in FIG. 26. Additionally, the communication apparatus according to the second example may be dented as "communication apparatus 232" in the following description in order to discriminate from the communication apparatuses according to the above embodiment and the respective variants or the communication apparatuses according to the other examples.

The reference numerals 201 to 205 in FIG. 27 correspond to the backside 201 and the end faces 202 to 205 of the casing 209, respectively, in the example described with reference to FIG. 5. Further, the reference numeral U115 schematically illustrates a region blocked by a user's hand (or the hand U113 illustrated in FIG. 26).

That is, particularly in a case where around the centers of both ends (or the end faces 203 and 205) in the short direction are held with a hand as illustrated in FIG. 26 while the communication apparatus 232 is vertically held, a millimeter wave is difficult to transmit or receive by an antenna apparatus even if the antenna apparatus is provided in the region U115. Assuming the case, for example, antenna apparatuses may be provided at the upper and lower positions as illustrated in FIG. 27 while the communication apparatus 231 is vertically held. For example, a reference numeral 2320 in FIG. 27 schematically illustrates an antenna apparatus provided in the communication apparatus 232 according to the present example.

Further, in the example illustrated in FIG. 27, even if an antenna apparatus is installed in the region U115, the antenna apparatus hardly contributes to an enhancement in communication property in communication using millimeter waves. Thus, assuming that the communication apparatus 232 is held as illustrated in FIG. 26, an antenna apparatus positioned in the region U115 illustrated in FIG. 27 may be temporarily disabled or an antenna apparatus may not be provided within the region U115, for example.

Other exemplary antenna apparatus installation position assuming that the communication apparatus is vertically held has been described above according to the second example with reference to FIG. 26 and FIG. 27.

Third Example: Third Exemplary Configuration Assuming Vertical Holding

Figure 28:
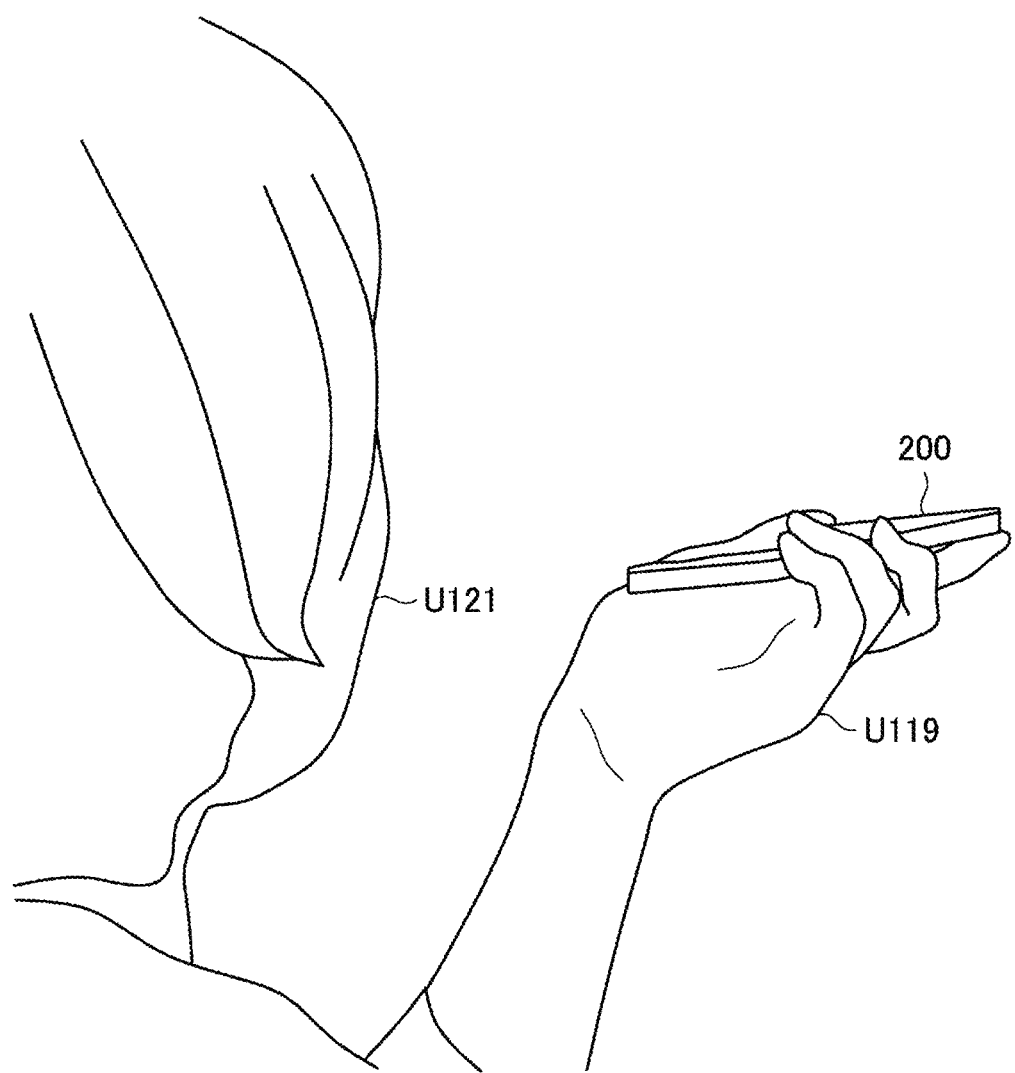
FIG. 28 is an explanatory diagram for explaining an outline of a communication apparatus according to a third example.
Figure 29:
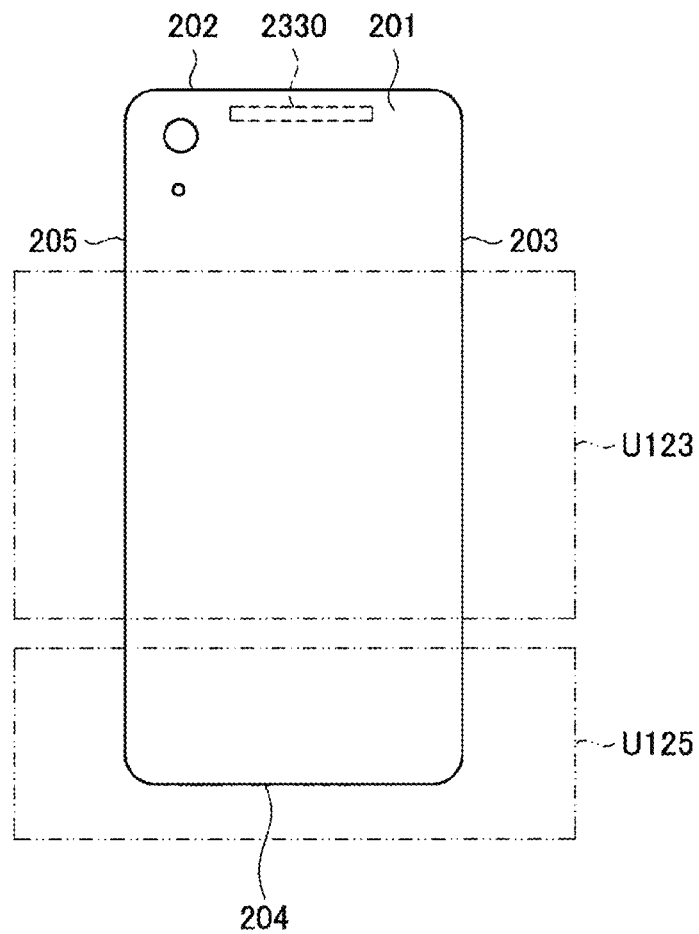
FIG. 29 is an explanatory diagram for explaining of an outline of the communication apparatus according to the third example.

Other exemplary antenna apparatus installation position assuming that a communication apparatus is vertically held will be subsequently described according to a third example with reference to FIG. 28 and FIG. 29. FIG. 28 and FIG. 29 are explanatory diagrams for explaining an outline of a communication apparatus according to the third example.

For example, FIG. 28 illustrates other example in which a communication apparatus (such as the terminal apparatus 200) such as Smartphone is vertically held. Specifically, in the example illustrated in FIG. 28, the user grips around the centers of both ends in the short direction of the casing 209 of the terminal apparatus 200 with a hand U119. Further, in the example illustrated in FIG. 28, a sound collection part such as microphone is provided on the lower side of the communication apparatus, and the user holds the communication apparatus such that the lower side is positioned near the head U121 (particularly the mouth) of the user.

Further, FIG. 29 is a diagram schematically illustrating a part blocked by a user's hand in the respective parts of the terminal apparatus 200 and a part positioned near the head of the user in a case where the terminal apparatus 200 is held as illustrated in FIG. 28. Additionally, the communication apparatus according to the third example may be denoted as "communication apparatus 233" in the following description in order to discriminate from the communication apparatuses according to the above embodiment and the respective variants or the communication apparatuses according to the other examples.

The reference numerals 201 to 205 in FIG. 29 correspond to the backside 201 and the end faces 202 to 205 of the casing 209, respectively, in the example described with reference to FIG. 5. Further, a reference numeral U123 schematically illustrates a region blocked by a user's hand (or the hand U119 illustrated in FIG. 28). Further, a reference numeral U125 schematically illustrates a region positioned near the head (the head U121 illustrated in FIG. 28) of the user.

That is, particularly in a case where around the centers of both ends (or the end faces 203 and 205) in the short direction are held with a hand as illustrated in FIG. 28 while the communication apparatus 233 is vertically held, a millimeter wave is difficult to transmit or receive by an antenna apparatus even if the antenna apparatus is provided in the region U123. Further, the legally-defined conditions for human body, particularly the head may be severer than those for other sites in terms of human body protection from wireless signals (particularly millimeter waves). Assuming the case, for example, an antenna apparatus may be provided at an upper part as illustrated in FIG. 29 in a case where the communication apparatus 231 is vertically held. For example, a reference numeral 2330 in FIG. 29 schematically illustrates an antenna apparatus provided in the communication apparatus 233 according to the present example.

Further, in the example illustrated in FIG. 29, even if an antenna apparatus is installed in the region U123, the antenna apparatus hardly contributes to an enhancement in communication property in communication using millimeter waves. Thus, assuming that the communication apparatus 233 is held as illustrated in FIG. 28, for example, an antenna apparatus positioned within the region U123 illustrated in FIG. 29 may be temporarily disabled, or an antenna apparatus may not be provided within the region U123.

Further, in consideration of influences on human body by wireless signals, a region where the sound collection part such as microphone is provided, such as the region U125, is positioned near the head of the user depending on a situation. In terms of such a situation, it may be desirable that the antenna apparatus provided in the region U125 is not used for communication using millimeter waves. Thus, assuming that the communication apparatus 233 is held as illustrated in FIG. 28, an antenna apparatus positioned within the region U125 illustrated in FIG. 29 may be temporarily disabled or an antenna apparatus may not be provided within the region U125, for example.

Other exemplary antenna apparatus installation position assuming that the communication apparatus is vertically held has been described above according to the third example with reference to FIG. 28 and FIG. 29.

Fourth Example: Exemplary Configuration Assuming Horizontal Holding

Figure 30:
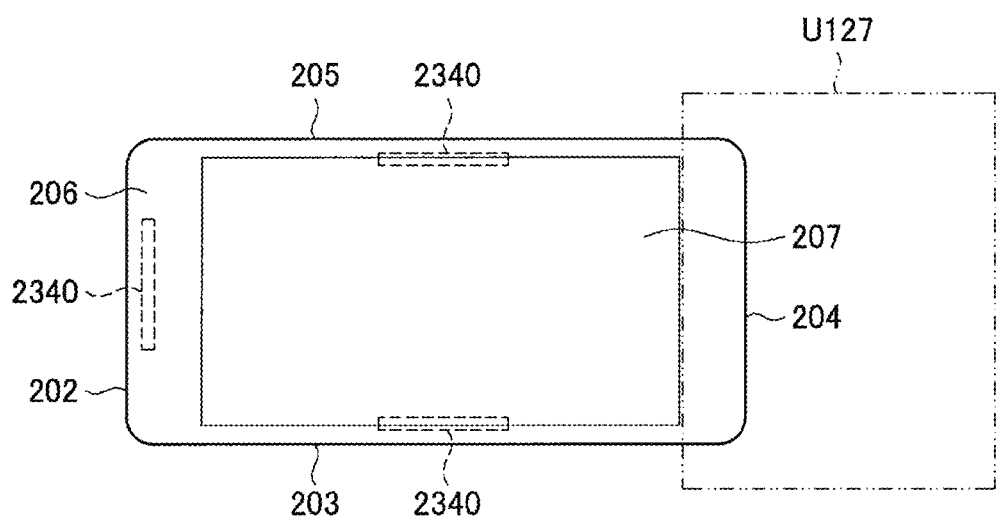
FIG. 30 is an explanatory diagram for explaining an outline of a communication apparatus according to a fourth example.
Figure 31:
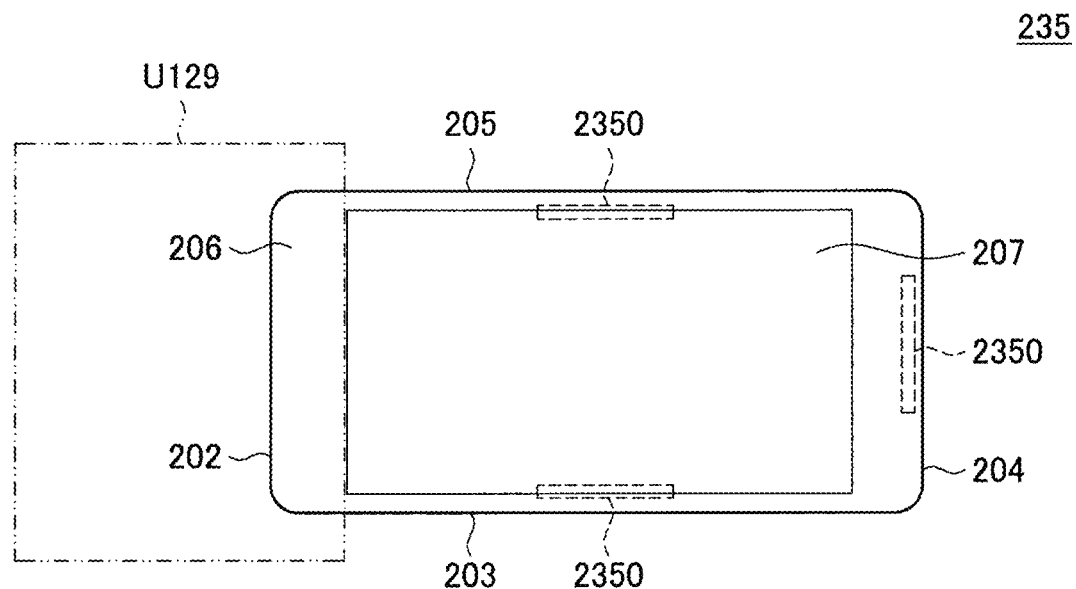
FIG. 31 is an explanatory diagram for explaining an outline of the communication apparatus according to the fourth example.
Figure 32:
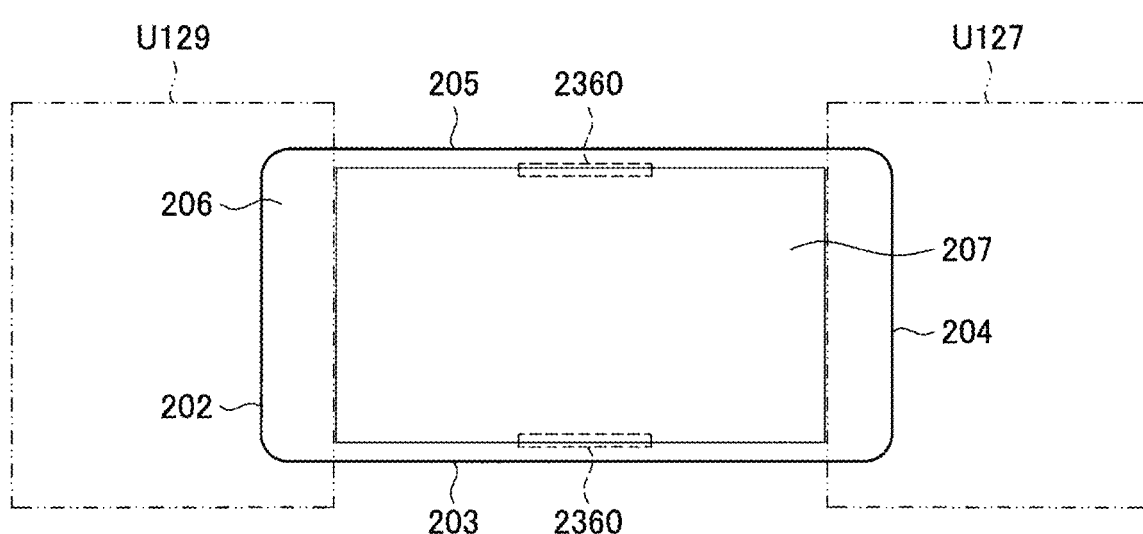
FIG. 32 is an explanatory diagram for explaining an outline of the communication apparatus according to the fourth example.

An exemplary antenna apparatus installation position assuming that a communication apparatus is horizontally held will be subsequently described according to a fourth example with reference to FIG. 30 to FIG. 32. FIG. 30 to FIG. 32 are explanatory diagrams for explaining an outline of a communication apparatus according to the fourth example.

Specifically, FIG. 30 to FIG. 32 particularly illustrate that the user holds a communication apparatus to oppose a display part 207 (such as display) provided on the top side 206 of the casing 209 of the communication apparatus in a case where the communication apparatus (such as the terminal apparatus 200) such as Smartphone is horizontally held by way of example. Additionally, the communication apparatuses illustrated in FIG. 30, FIG. 31, and FIG. 32 may be denoted as "communication apparatus 234", "communication apparatus 235", and "communication apparatus 236", respectively, in the present invention in order to discriminate from the communication apparatuses according to the above embodiment and the respective variants or the communication apparatuses according to the other examples. Further, the reference numerals 202 to 205 in each of FIG. 30 to FIG. 32 correspond to the end faces 202 to 205 of the casing 20) in the example described with reference to FIG. 5. Further, the reference numeral 206 indicates the top side of the casing 209, and the reference numeral 207 indicates a display part (display) provided on the top side 206.

The example illustrated in FIG. 30 will be first described. The example illustrated in FIG. 30 illustrates that the end face 204 positioned on the right side viewed from a user is held with a user's hand (such as the right hand) such that the end face 205 is positioned upward viewed from the user by way of example. Further, a reference numeral U127 in FIG. 30 schematically illustrates a region blocked by a user's hand.

Particularly in a case where the end face 204 is held with a hand as illustrated in FIG. 30 while the communication apparatus 234 is horizontally held, a millimeter wave is difficult to transmit or receive by an antenna apparatus even if the antenna apparatus is provided in the region U127. Assuming the case, for example, antenna apparatuses may be provided at the upper, lower, and left positions viewed from the user as illustrated in FIG. 30 in a case where the communication apparatus 234 is horizontally held. For example, a reference numeral 2340 in FIG. 30 schematically illustrates an antenna apparatus provided in the communication apparatus 234 illustrated in FIG. 30 in the communication apparatuses according to the present example.

Further, in the example illustrated in FIG. 30, an antenna apparatus hardly contributes to an enhancement in communication property in communication using millimeter waves even if the antenna apparatus is installed in the region U127. Thus, assuming that the communication apparatus 234 is held as illustrated in FIG. 30, an antenna apparatus positioned within the region U127 illustrated in FIG. 30 may be temporarily disabled or an antenna apparatus may not be provided within the region U127, for example.

The example illustrated in FIG. 31 will be described below. The example illustrated in FIG. 31 illustrates that the end face 202 positioned on the left side viewed from the user is held with a users hand (such as the left hand) such that the end face 205 is positioned upward viewed from the user by way of example. Further, a reference numeral U129 in FIG. 31 schematically illustrates a region blocked by a users hand.

Particularly in a case where the end face 202 is held with a hand as illustrated in FIG. 31 while the communication apparatus 235 is horizontally held, a millimeter wave is difficult to transmit or receive by an antenna apparatus even if the antenna apparatus is provided in the region U129. Assuming the case, for example, in a case where the communication apparatus 235 is horizontally held as illustrated in FIG. 31, antenna apparatuses may be provided on the upper, lower, and right positions viewed from the user. For example, a reference numeral 2350 in FIG. 31 schematically illustrates an antenna apparatus provided in the communication apparatus 235 illustrated in FIG. 31 in the communication apparatuses according to the present example.

Further, in the example illustrated in FIG. 31, an antenna apparatus hardly contributes to an enhancement in communication property in communication using millimeter waves even if the antenna apparatus is installed in the region U129. Thus, assuming that the communication apparatus 235 is held as illustrated in FIG. 31, an antenna apparatus positioned within the region U129 illustrated in FIG. 31 may be temporarily disabled or an antenna apparatus may not be provided within the region U129, for example.

The example illustrated in FIG. 32 will be described below. The example illustrated in FIG. 32 illustrates that both the end faces 202 and 204 positioned on the left and right sides viewed from the user are held with user's hands (such as both hands) such that the end face 205 is positioned upward viewed from the user by way of example. Further, the reference numerals U127 and U129 in FIG. 32 schematically illustrate regions blocked by the users hands, respectively.

Particularly in a case where both the end faces 202 and 204 are held by both hands as illustrated in FIG. 32 while the communication apparatus 236 is horizontally held, a millimeter wave is difficult to transmit or receive by antenna apparatuses even if the antenna apparatuses are provided in the regions U127 and U129. Assuming the case, for example, in a case where the communication apparatus 236 is horizontally held as illustrated in FIG. 32, antenna apparatuses may be provided at the upper and lower positions viewed from the user. For example, a reference numeral 2360 in FIG. 32 schematically illustrates an antenna apparatus provided in the communication apparatus 236 illustrated in FIG. 32 in the communication apparatuses according to the present example.

Further, in the example illustrated in FIG. 32, antenna apparatuses hardly contribute to an enhancement in communication property in communication using millimeter waves even if the antenna apparatuses are installed in the regions U127 and U129, respectively. Thus, assuming that the communication apparatus 236 is held as illustrated in FIG. 32, the antenna apparatuses positioned in the regions U1127 and U129 illustrated in FIG. 32 may be temporarily disabled or an antenna apparatus may not be provided in the regions U127 and U129, for example.

An exemplary antenna apparatus installation position assuming that the communication apparatus is horizontally held has been described above according to the fourth example with reference to FIG. 30 to FIG. 32.

Figure 33:
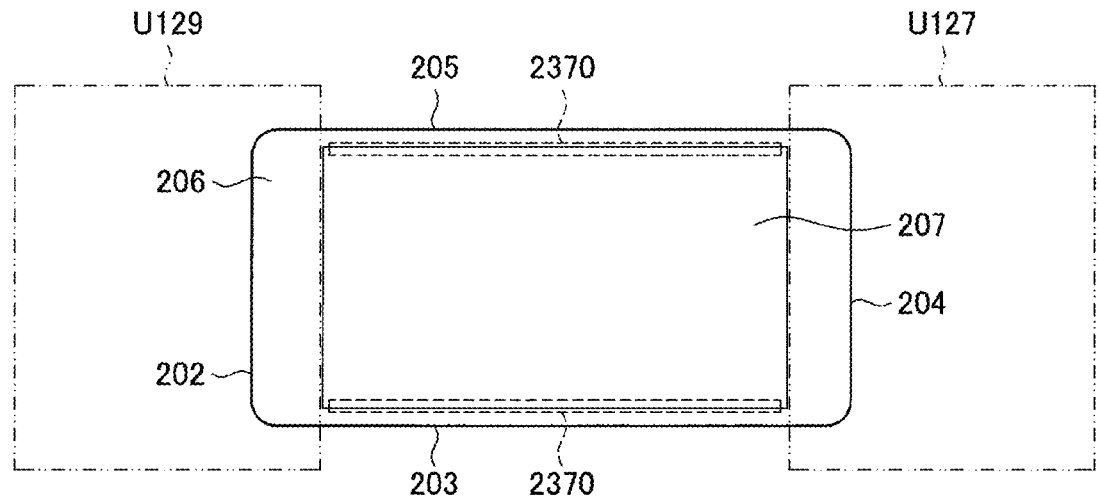
FIG. 33 is an explanatory diagram for explaining an outline of a communication apparatus according to a fifth example.
Figure 34:
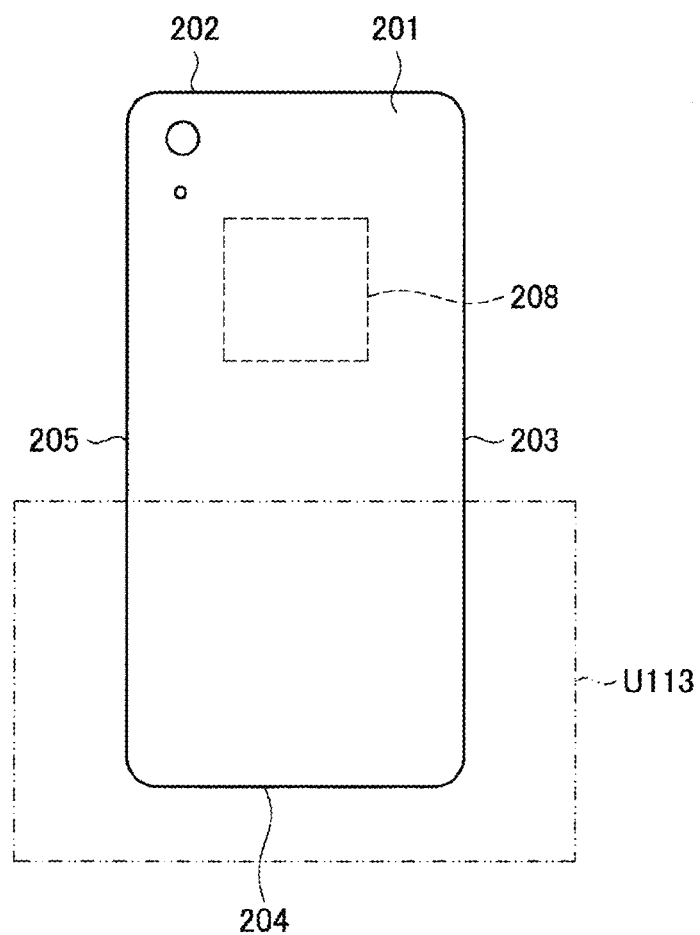
FIG. 34 is an explanatory diagram for explaining an outline of the communication apparatus according to the fifth example.

Fifth Example: Configuration Assuming Predetermined Device Installation Position An exemplary antenna apparatus installation position assuming a predetermined device installation position will be subsequently described according to a fifth example with reference to FIG. 33 and FIG. 34. FIG. 33 and FIG. 34 are explanatory diagrams for explaining an outline of a communication apparatus according to the fifth example.

Specifically, a form in which a communication apparatus is held (or how to hold a communication apparatus) may be limited for some devices among various devices provided in the communication apparatus depending on the positions where the devices are installed in order to cause the devices to function.

For example, FIG. 33 illustrates an exemplary antenna apparatus installation position assuming a position where a display part such as display is installed. Additionally, particularly the communication apparatus illustrated in FIG. 33 among the communication apparatuses according to the fifth example may be denoted as "communication apparatus 237" in the following description in order to discriminate from the communication apparatuses according to the above embodiment and the respective variants or the communication apparatuses according to the other examples.

The reference numerals 202 to 205 in FIG. 33 correspond to the end faces 202 to 205 of the casing 209 in the example described with reference to FIG. 5. Further, the reference numeral 206 indicates the top side of the casing 20), and the reference numeral 207 indicates a display part (display) provided on the top side 206. Additionally, the example illustrated in FIG. 33 schematically illustrates a state in which the user horizontally holds the communication apparatus 237 in order to view a video such as moving picture by use of the communication apparatus 237. More specifically, in the example illustrated in FIG. 33, both the end faces 202 and 204 positioned on the left and right sides viewed from the user are held by user's hands (such as both hands) such that the end face 205 is positioned upward viewed from the user. That is, the reference numerals U127 and U129 schematically illustrate the regions blocked by the user's hands, respectively.

As illustrated in FIG. 33, when at least part of the display part 207 displaying a video thereon is held with a hand or the like while the user views the video such as moving picture, the display part 207 is blocked by the hand or the like. Thus, it is expected that the communication apparatus 237 is less likely to be held to block the display part 207. Further, the screen of video contents such as movie or game is configured such that the horizontal direction is longer than the vertical direction in many cases, and the communication apparatus 237 is likely to be horizontally held while a video content is viewed. Additionally, for horizontal holding, the end face 205 may be held upward as illustrated in FIG. 33, or the end face 203 may be held upward.

In terms of the above situation, the regions denoted with a reference numeral 2370, or the parts extending along the ends in the longitudinal direction of the display part 207 on the end faces 203 and 205 are less likely to be blocked by user's hands or the like. Thus, an antenna apparatus is held in at least part of the regions 2370, and thus the communication apparatus is likely to contribute to an enhancement in communication property in communication using millimeter waves.

Further, FIG. 34 illustrates an exemplary antenna apparatus installation position assuming a position where an antenna used for non-contact communication such as near field radio communication (NFC) is installed. Additionally, particularly the communication apparatus illustrated in FIG. 34 in the communication apparatuses according to the fifth example may be denoted as "communication apparatus 238" in the following description in order to discriminate from the communication apparatuses according to the above embodiment and the respective variants or the communication apparatuses according to the other examples.

The reference numerals 201 to 205 in FIG. 33 correspond to the backside 201 and the end faces 202 to 205 of the casing 209, respectively, in the example described with reference to FIG. 5. Additionally, the example illustrated in FIG. 33 schematically illustrates a state in which the user horizontally holds the communication apparatus 237 in order to view a video such as moving picture by use of the communication apparatus 237. Additionally, a reference numeral 208 in FIG. 34 schematically illustrates an antenna used for non-contact communication. Further, the reference numeral U113 schematically illustrates a region blocked by a user's hand.

In a case where the user holds the communication apparatus 238 when using non-contact communication, it is assumed that the user holds a different part from the position where the antenna 208 used for the communication is provided. For example, in the example illustrated in FIG. 34, the antenna 208 is provided in a region positioned on the upper side viewed from the user in a case where the communication apparatus 238 is vertically held. In such a situation, it is expected that the user holds other different region from the region where the antenna 208 is provided like the region U113 positioned on the lower side of the communication apparatus 238, for example, as illustrated in FIG. 34.

Thus, an antenna apparatus used for communication using millimeter waves (or the antenna apparatus according to the present embodiment) may be provided in a region near the antenna 208 used for non-contact communication, for example. As a more specific example, in a case where the antenna 208 is configured as a loop antenna, for example, the communication apparatus according to the present embodiment may be provided to be positioned on the opening of the element of the antenna 208.

Additionally, the above example is merely exemplary, and does not necessarily limit the antenna apparatus installation position according to the present embodiment. That is, if an antenna apparatus installation position is determined in consideration of a region blocked by a site such as hand depending on the holding method while how to hold the communication apparatus is limited depending on a predetermined device installation position, the kind of the device is not particularly limited, and the antenna apparatus installation position is not limited.

An exemplary antenna apparatus installation position assuming a predetermined device installation position has been described above according to the fifth example with reference to FIG. 33 and FIG. 34.

Sixth Example: Specific Example of Antenna Apparatus Installation Position

Figure 35:
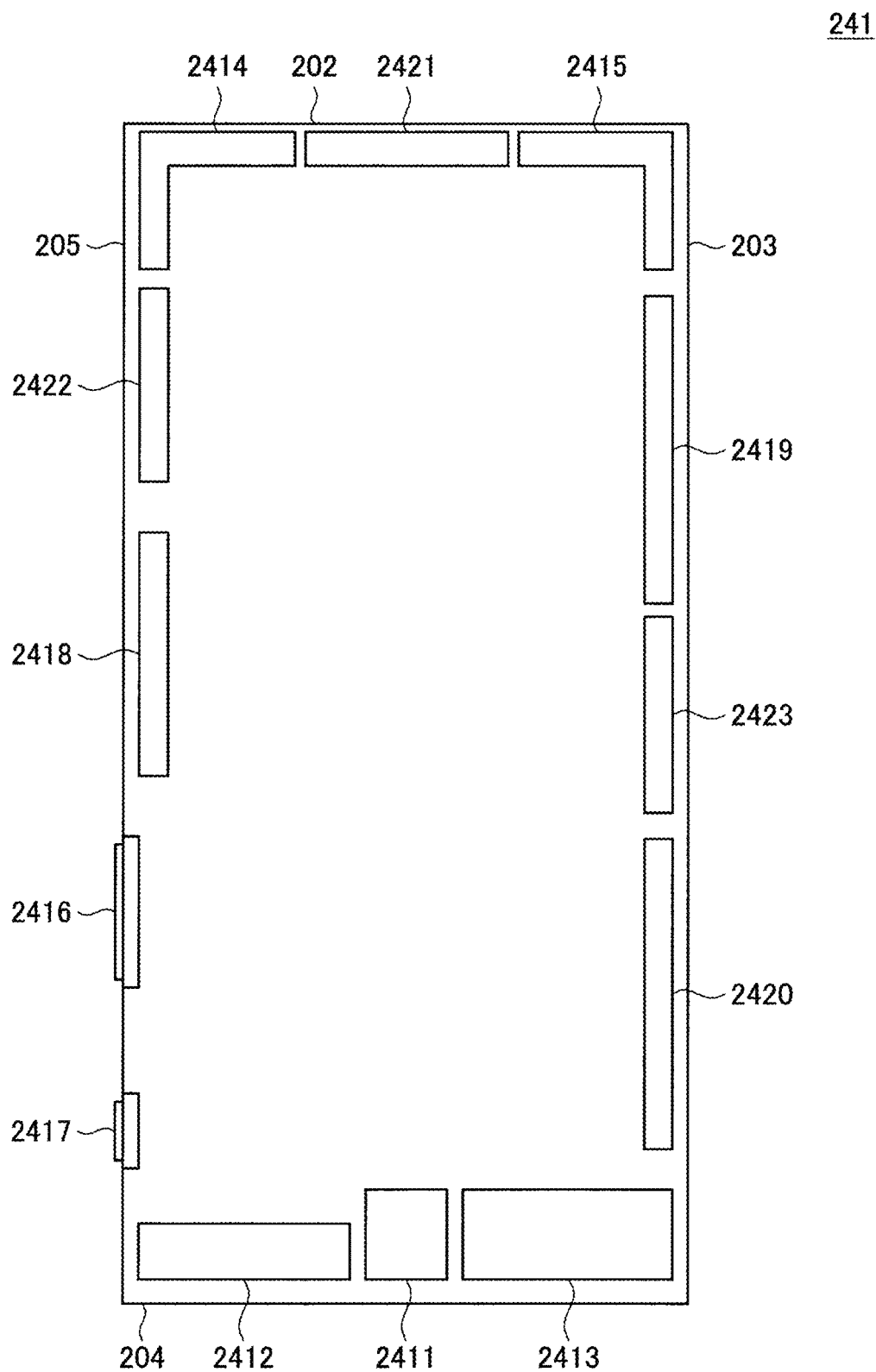
FIG. 35 is an explanatory diagram for explaining an exemplary configuration of a communication apparatus according to a sixth example.

A more specific example of an antenna apparatus installation position assuming a portable communication apparatus such as Smartphone will be subsequently described according to a sixth example with reference to FIG. 35. FIG. 35 is an explanatory diagram for explaining an exemplary configuration of a communication apparatus according to the sixth example, and illustrates an exemplary schematic internal structure of the communication apparatus. Additionally, the example illustrated in FIG. 35 illustrates only some devices for easily understanding the characteristics of the communication apparatus according to the present example, and does not illustrate the other devices. Further, the communication apparatus according to the sixth example may be denoted as "communication apparatus 241" in the following description in order to discriminate from the communication apparatuses according to the above embodiment and the respective variants or the communication apparatuses according to the other examples.

The reference numerals 202 to 205 in FIG. 35 correspond to the end faces 202 to 205 of the casing 209, respectively, in the example described with reference to FIG. 5. That is, the upward direction in FIG. 35 corresponds to the upward direction in a case where the communication apparatus 241 is vertically held.

A reference numeral 2411 in FIG. 35 indicates a universal serial bus (USB) terminal. Further, reference numerals 2412 and 2413 indicate an antenna used for communication based on a standard such as LTE/LTE-A (or communication using an ultrahigh frequency of around 700 MHz to 3.5 GHz). Further, reference numerals 2414 and 2415 indicate an antenna supplementally used for communication based on a standard such as LTE/LTE-A. Further, reference numerals 2418 to 2420 indicate an antenna used for communication based on a standard such as WiFi (registered trademark), an antenna supplementally used for communication based on a standard such as LTE/LTE-A, or the like. Further, reference numerals 2416 and 2417 indicate an input device such as button provided on the end face 205 of the communication apparatus 241.

As illustrated in FIG. 35, the USB terminal 2411 or the antenna 2413 used for communication based on a standard such as LTE/LTE-A is arranged near the end face 203 on the lower side of the communication apparatus 241, and the space therefor is limited. Thus, in the example illustrated in FIG. 35, the antenna apparatuses according to the present embodiment are provided to be positioned near the respective end faces (or the end faces 202, 203, and 205) other than the end face 204 positioned on the lower side among the end faces 202 to 205 of the casing 209 in the communication apparatus 241. For example, reference numerals 2421 to 2423 indicate an antenna apparatus according to the present embodiment. Additionally, it is of course desirable that the antenna apparatuses 2421 to 2423 according to the present embodiment are installed to avoid interfering with other devices such as the antennas 2414 and 2415, the antennas 2418 to 2420, and the input devices 2416 and 2417 as illustrated in FIG. 35.

A more specific example of an antenna apparatus installation position assuming a portable communication apparatus such as Smartphone has been described above according to the sixth example with reference to FIG. 35.

Seventh Example: Configuration Assuming the Use of Accessory

Figure 36:
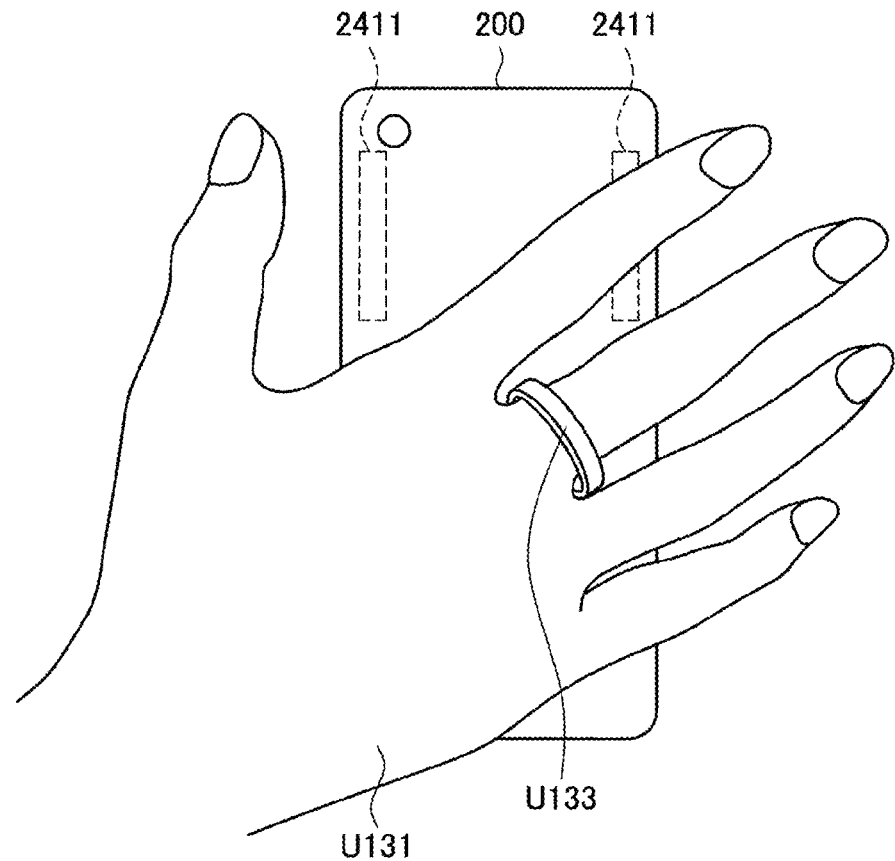
FIG. 36 is an explanatory diagram for explaining an outline of a communication apparatus according to a seventh example.

An exemplary antenna apparatus installation position assuming the use of an accessory such as so-called holder will be subsequently described according to a seventh example with reference to FIG. 36. FIG. 36 is an explanatory diagram for explaining an outline of a communication apparatus according to the seventh example.

For example, FIG. 36 illustrates an exemplary communication apparatus holding method in a case where an anti-drop ring holder is used. Specifically, in the example illustrated in FIG. 36, a ring holder U133 is attached on the back of the casing of the terminal apparatus 200, and the user holds the casing of the terminal apparatus 200 with his/her finger through the ring part of the ring holder U133. In this way, a form in which the terminal apparatus 200 is held (or how to hold a communication apparatus) may be limited assuming the use of a predetermined accessory.

As a more specific example, in the example illustrated in FIG. 36, the ring holder U133 is attached on substantially the center of the back of the casing of the terminal apparatus 200, and the user holds the terminal apparatus 200 by horizontally gripping around the centers of both ends in the short direction of the casing. Thus, in this case, in a case where the antenna apparatuses according to the present embodiment are provided near both ends in the short direction of the casing, it is better that they are provided to be positioned on the upper side of the casing which is not blocked by a users hand. For example, the reference numeral 2411 schematically illustrates an antenna apparatus according to the present embodiment.

Additionally, as described above according to the sixth example, an antenna used for communication based on other standard such as LTE/LTE-A or WiFi may be provided in the communication apparatus in addition to the antenna apparatuses according to the present embodiment. Thus, in a case where the positions where an antenna apparatus can be installed are limited, the communication apparatus may be configured such that the antenna apparatuses according to the present embodiment are present together with an antenna used for communication based on other standard, for example.

An exemplary antenna apparatus installation position assuming the use of an accessory such as so-called holder has been described above according to the seventh example with reference to FIG. 36.

3.5. APPLICATIONS

There will be subsequently described exemplary cases in which the technology according to the present disclosure is applied to apparatuses other than the communication terminals such as Smartphone as applications of a communication apparatus according to one embodiment of the present disclosure.

In recent years, a technology for connecting various things to a network called Internet of things (IoT) has been paid attention to, and is assumed to be usable in communication by apparatuses other than Smartphone or table terminal. Thus, for example, the technology according to the present disclosure is applied to various mobile apparatuses so that communication using millimeter waves is enabled for the apparatuses, and polarization MIMO can be used for the communication.

Figure 37:
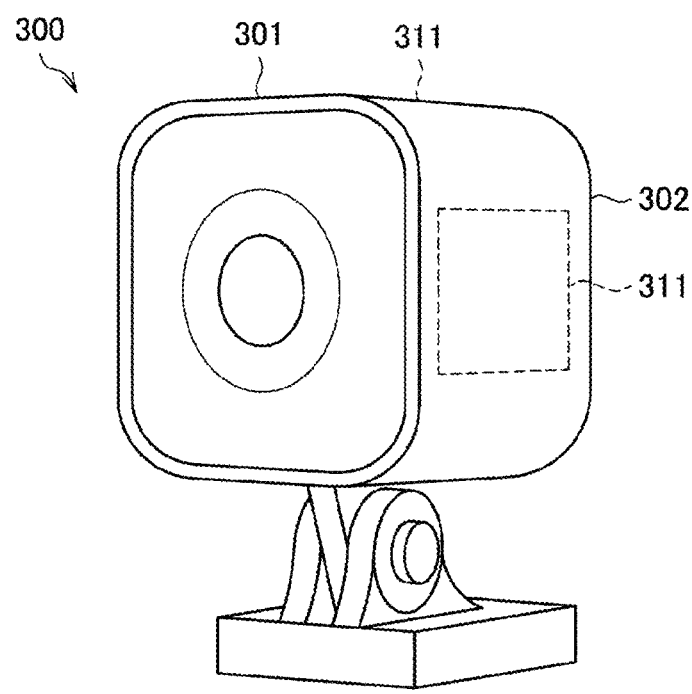
FIG. 37 is an explanatory diagram for explaining an application of the communication apparatus according to the embodiment.

For example, FIG. 37 is an explanatory diagram for explaining an application of the communication apparatus according to the present embodiment, and illustrates that the technology according to the present disclosure is applied to a camera device by way of example. Specifically, in the example illustrated in FIG. 37, the antenna apparatuses according to one embodiment of the present disclosure are held to be positioned near the respective faces 301 and 302 facing in mutually different directions in the outer faces of the casing of a camera device 300. For example, a reference numeral 311 schematically illustrates an antenna apparatus according to one embodiment of the present disclosure. With the configuration, the camera device 300 illustrated in FIG. 37 can transmit or receive a respective plurality of polarized waves propagating in a direction substantially matching with the normal direction of each face and having mutually different polarization directions for the respective faces 301 and 302, for example. Additionally, the antenna apparatuses 311 may be provided on not only the faces 301 and 302 illustrated in FIG. 37 but also the other faces.

Figure 38:
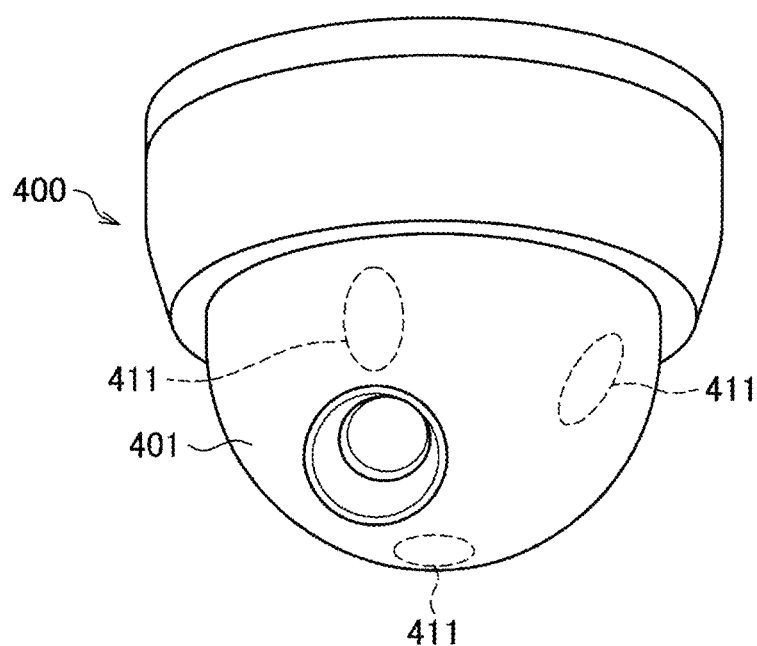
FIG. 38 is an explanatory diagram for explaining an application of the communication apparatus according to the embodiment.

Further, the technology according to the present disclosure can be applied to unmanned aircraft called drone, or the like. For example, FIG. 38 is an explanatory diagram for explaining an application of the communication apparatus according to the present embodiment, and illustrates that the technology according to the present disclosure is applied to a camera device installed on the lower part of a drone by way of example. Specifically, in the case of a drone flying high, it is desirable that wireless signals (millimeter waves) arriving in each direction can be transmitted or received mainly on the lower side. Thus, for example, in the example illustrated in FIG. 38, the antenna apparatuses according to one embodiment of the present disclosure are held to be positioned near each other in mutually different directions on an outer face 401 of a casing of a camera device 400 installed on the lower part of the drone. For example, a reference numeral 411 schematically illustrates an antenna apparatus according to one embodiment of the present disclosure. Further, though not illustrated in FIG. 38, not only the camera device 400 but also the antenna apparatuses 411 may be provided in the respective parts of the casing of the drone itself, for example. Also in this case, it is better that the antenna apparatuses 411 are provided particularly on the lower side of the casing.

Additionally, in a case where at least pan of the outer face of the casing of an apparatus of interest is curved (or rounded) as illustrated in FIG. 38, it is better that the antenna apparatuses 411 are held near a respective plurality of partial regions the normal directions of which cross each other or the normal directions of which are mutually twisted in the respective partial regions in the curved face. With the configuration, the camera device 400 illustrated in FIG. 38 can transmit or receive a respective plurality of polarized waves propagating in a direction substantially matching with the normal direction of each partial region and having mutually different polarization directions.

Additionally, the examples illustrated in FIG. 37 and FIG. 38 are merely exemplary, and the technology according to the present disclosure may be applied to apparatuses for communication using millimeter waves, not particularly limited.

Examples in which the technology according to the present disclosure is applied to apparatuses other than the communication terminals such as Smartphone have been described above as applications of the communication apparatus according to one embodiment of the present disclosure with reference to FIG. 37 and FIG. 38.

4. CONCLUSION

As described above, a communication apparatus according to one embodiment of the present disclosure includes a plurality of antenna parts for receiving or transmitting wireless signals, a communication control part for controlling transmitting or receiving wireless signals via at least any of the plurality of antenna parts, and a casing housing the communication control part. Further, the respective plurality of antenna parts is held near a respective plurality of partial regions the normal directions of which cross each other or the normal directions of which are mutually twisted on the outer faces of the casing, and transmits or receives a plurality of polarized waves propagating in a direction substantially orthogonal to each of the partial regions and having mutually different polarization directions.

With the configuration, also in a situation in which the position or orientation changes over time like a portable communication apparatus, the communication apparatus can realize polarization MIMO using a direct wave in a more suitable form in communication with other apparatus via a wireless communication path.

The preferred embodiments of the present disclosure have been described above in detail with reference to the accompanying drawings, but the technical scope of the present disclosure is not limited to the examples. It is apparent to those skilled in the art in the technical field of the present disclosure that various changes or modifications can be assumed within the scope of the technical spirit described in CLAIMS and these of course belong to the technical scope of the present disclosure.

Further, the effects described in the present specification are merely explanatory or exemplary, and are not restrictive.

That is, the technology according to the present disclosure can achieve other effects apparent to those skilled in the art from the description of the present specification together with the above effects or instead of the above effects.

Additionally, the following configurations also belong to the technical scope of the present disclosure.

(1)

A communication apparatus including:
  a plurality of antenna parts configured to receive or transmit a wireless signal;
  a communication control part configured to control transmitting or receiving the wireless signal via at least any of the plurality of antenna parts; and
  a casing housing the communication control part,
  in which each of the plurality of antenna parts is held near each of a plurality of partial regions normal directions of which cross each other or the normal directions of which are mutually twisted in outer faces of the casing, and transmit or receive a first wireless signal and a second wireless signal propagating in directions substantially orthogonal to the partial regions and having mutually different polarization directions.

(2)

The communication apparatus according to (1), in which the antenna part includes an antenna device configured to transmit or receive the first wireless signal and the second wireless signal the polarization directions of which are orthogonal to each other.

(3)

The communication apparatus according to (2), in which the antenna device is configured as a planar antenna.

(4)

The communication apparatus according to (2) or (3), in which the antenna part includes a plurality of the antenna devices.

(5)

The communication apparatus according to (1),
  in which the antenna part includes:
  a first antenna device configured to receive or transmit the first wireless signal; and
  a second antenna device configured to receive or transmit the second wireless signal.

(6)

The communication apparatus according to (5), in which at least any of the first antenna device and the second antenna device is configured as any of a monopole antenna, a dipole antenna, a one-side short-circuit planar antenna, a notch antenna, an inverted F-antenna, a loop antenna, and a slot antenna.

(7)

The communication apparatus according to (5) or (6), in which the antenna part includes at least any of a plurality of the first antenna devices or the second antenna devices.

(8)

The communication apparatus according to (1),
  in which the antenna parts are held along a plurality of the outer faces the normal directions of which cross each other or the normal directions of which are mutually twisted and are continuous, and
  include an antenna device configured to transmit or receive the first wireless signal and the second wireless signal propagating in a direction substantially orthogonal to the partial region of the outer face for each of the plurality of outer faces.

(9)

The communication apparatus according to any one of (1) to (8), in which the communication control part controls receiving the first wireless signal and the second wireless signal arriving in the normal direction of a second partial region different from a first partial region gripped by a user by the antenna part held near the second partial region in the outer faces of the casing.

(10)

The communication apparatus according to any one of (1) to (9),
in which at least one face of the outer faces of the casing forms a rectangular shape, and
at least some antenna parts in the plurality of antenna parts are held near the partial regions of at least some of end faces positioned around the face.

(01)

The communication apparatus according to (10), in which at least some antenna parts in the plurality of antenna parts are held near the partial regions of at least some of the end faces positioned on an upper side in a case where the casing is gripped such that a longitudinal direction of the face is a vertical direction.

(12)

The communication apparatus according to (10) or (11), in which at least some antenna parts in the plurality of antenna pans are held near the partial regions of at least some of the end faces positioned on the upper side in a case where the casing is gripped such that the vertical direction of the casing substantially matches with a vertical direction of a user facing the face of the casing.

(13)

The communication apparatus according to any one of (10) to (12), in which at least some antenna parts in the plurality of antenna parts are held near the partial regions of at least some of faces extending in the longitudinal direction of the face in the end faces.

(14)

The communication apparatus according to any one of (10) to (13), in which at least some antenna parts in the plurality of antenna parts are held near the partial region of at least part of the face.

(15)

The communication apparatus according to any one of (10) to (14),
in which a display part in a rectangular shape is provided on the face, and
at least some antenna parts in the plurality of antenna parts are held near the partial regions of at least some of faces extending along the ends in a longitudinal direction of the display part in the end faces.

(16)

The communication apparatus according to any one of (1) to (15), in which at least two antenna parts in the plurality of antenna parts are held near a plurality of the partial regions the normal directions of which cross each other or the normal directions of which are mutually twisted in the outer faces at least part of which is curved.

REFERENCE SIGNS LIST

1 System
100 Base station
200 Terminal apparatus
2001 Antenna part
2003 Wireless communication part
2005 Communication control part
2007 Storage part
209 Casing
2111a to 2111f Antenna apparatus

The invention claimed is:

1. A communication apparatus comprising:
a plurality of antenna parts configured to receive or transmit one or more wireless signals;
a communication control circuit configured to control transmitting or receiving of the one or more wireless signals via at least one of the plurality of antenna parts; and
a casing housing the communication control circuit and the plurality of antenna parts,
wherein each of the plurality of antenna parts is held near each of a plurality of partial regions of an inside of outer faces of the casing, each of the plurality of partial regions having a respective one of a plurality of normal directions, the plurality of normal directions cross each other, and the plurality of antenna parts are configured to transmit or receive a first wireless signal and a second wireless signal propagating in directions substantially orthogonal to the partial regions and having mutually different polarization directions,
wherein a first antenna part of the plurality of antenna parts is disposed in a first region of the plurality of partial regions, the first antenna part comprises multiple first antenna elements, the multiple first antenna elements are disposed along a first line parallel to a first end face from among the outer faces of the casing,
wherein a second antenna part of the plurality of antenna parts is disposed in a second region of the plurality of partial regions, the second antenna part is coupled to the first antenna part and comprises multiple second antenna elements, the multiple second antenna elements are disposed along a second line parallel to a second end face from among the outer faces of the casing, and the first end face is orthogonal to the second end face,
wherein a first number of the multiple first antenna elements is four (4) or more,
wherein a second number of the multiple second antenna elements is four (4) or more,
wherein the first line along which the multiple first antenna elements are disposed is substantially parallel to the second line along which the multiple second antenna elements are disposed,
wherein the first antenna part is configured to perform first beamforming by controlling at least one of first phases or first powers of a first plurality of wireless signals transmitted or received by each of the multiple first antenna elements, and
wherein the second antenna part is configured to perform second beamforming by controlling at least one of second phases or second powers of a second plurality of wireless signals transmitted or received by each of the multiple second antenna elements.

2. The communication apparatus according to claim 1, wherein the first number of the multiple first antenna elements is equal to the second number of the multiple second antenna elements.

3. The communication apparatus according to claim 2, wherein each of the multiple first antenna elements and the multiple second antenna elements is a patch antenna.

4. The communication apparatus according to claim 3, wherein each of the patch antennas is configured to transmit or receive the first wireless signal and the second wireless signal with respective polarization directions which are orthogonal to each other.

5. The communication apparatus according to claim 4, wherein
   the first antenna part is configured to receive or transmit the first wireless signal, which is a first millimeter wave signal or which has a frequency of 28 GHz or 390 Hz; and
   the second antenna part is configured to receive or transmit the second wireless signal, which is a second millimeter wave signal or which has a frequency of 28 GHz or 390 Hz.

6. The communication apparatus according to claim 5, wherein the communication control circuit is configured to control receiving the first wireless signal and the second wireless signal arriving in the normal direction of a second partial region, the second partial region is different from a first partial region configured to be gripped by a user, with at least one of the plurality of antenna parts configured to be held near the second partial region of the inside of the outer faces of the casing.

7. The communication apparatus according to claim 6, wherein at least one face of the outer faces of the casing forms a rectangular shape, and
   at least some of the plurality of antenna parts are held near the partial regions of at least some of a plurality of end faces positioned around the at least one face.

8. The communication apparatus according to claim 7, wherein the at least some of the plurality of antenna parts are held near the partial regions of at least some of the plurality of end faces positioned on an upper side in a case where the casing is configured to be gripped such that a longitudinal direction of the at least one face is a vertical direction.

9. The communication apparatus according to claim 8, wherein a display part in a rectangular shape is provided on the at least one face, and
the at least some of the plurality of antenna parts are held near the partial regions of at least some of the plurality of end faces.

* * * * *